Sept. 15, 1964  E. A. VERRINDER ETAL  3,148,774
ARTICLE HANDLING METHOD AND APPARATUS
Filed Aug. 23, 1956  21 Sheets-Sheet 6
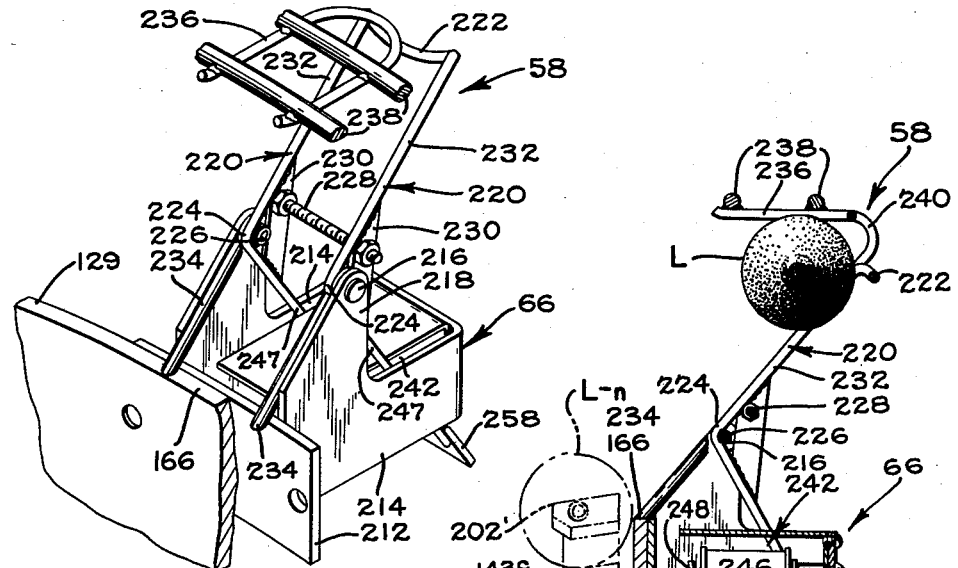
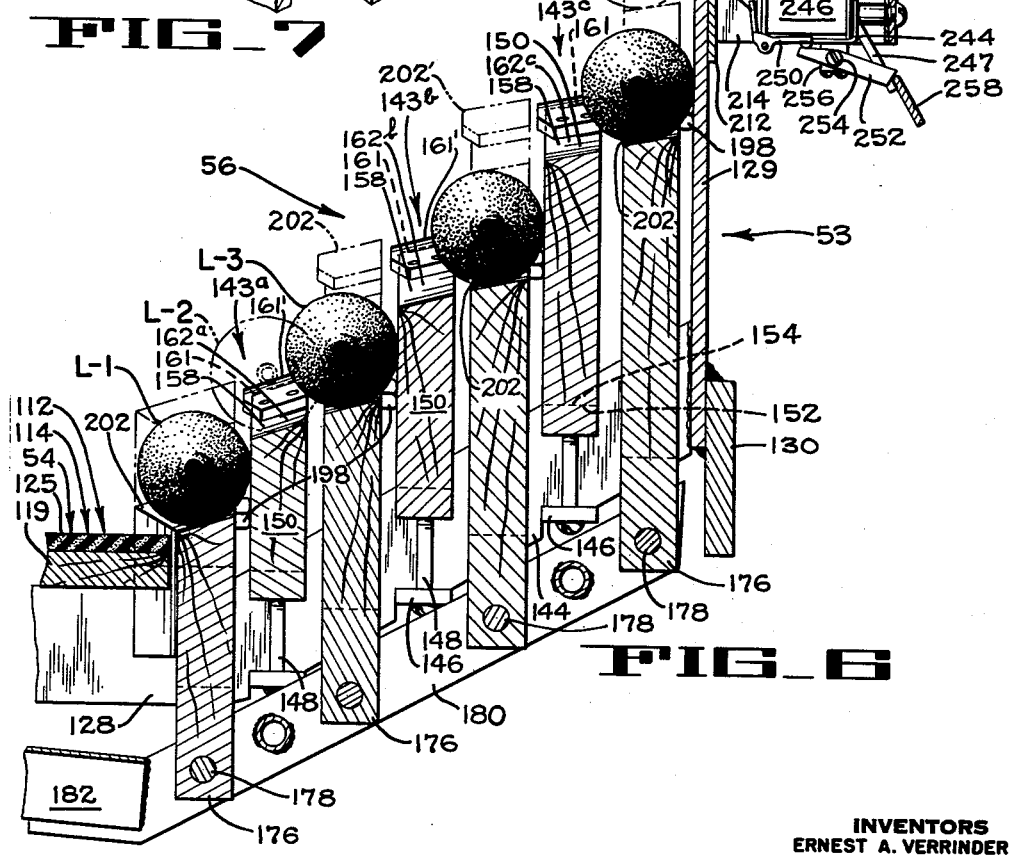
INVENTORS
ERNEST A. VERRINDER
JOHN R. RICHARDS
BY Hans G. Hoffmeister
ATTORNEY

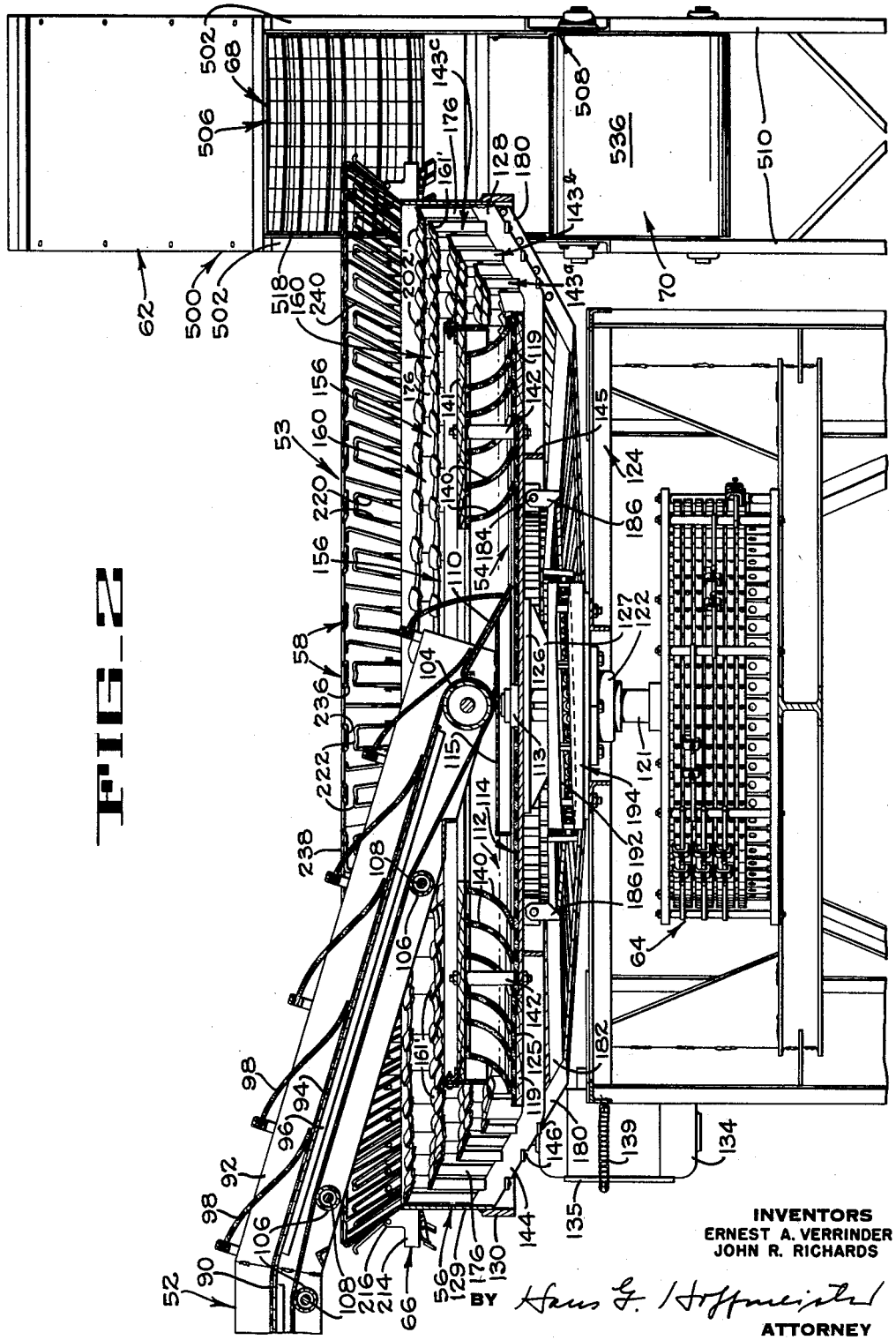

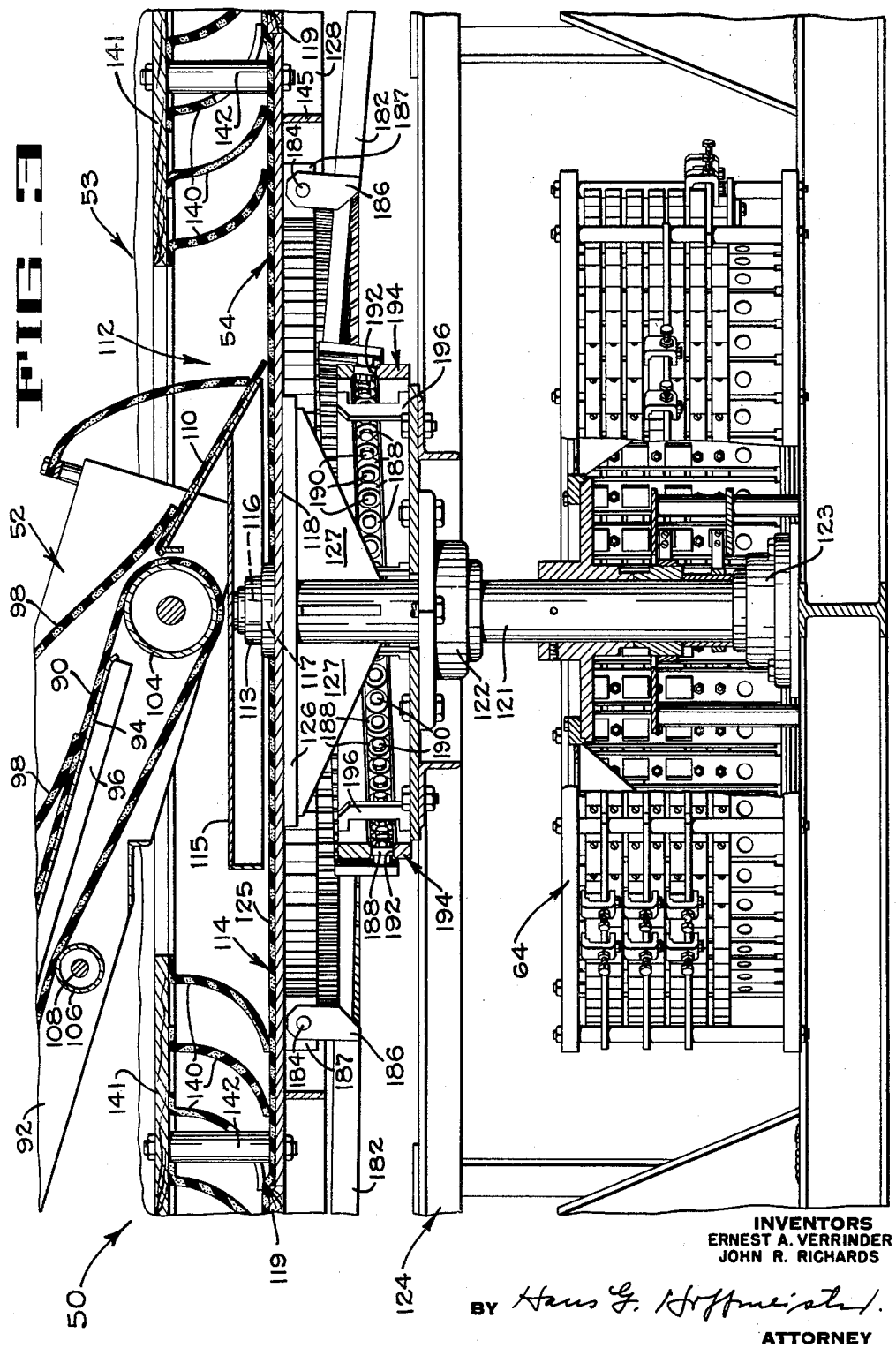

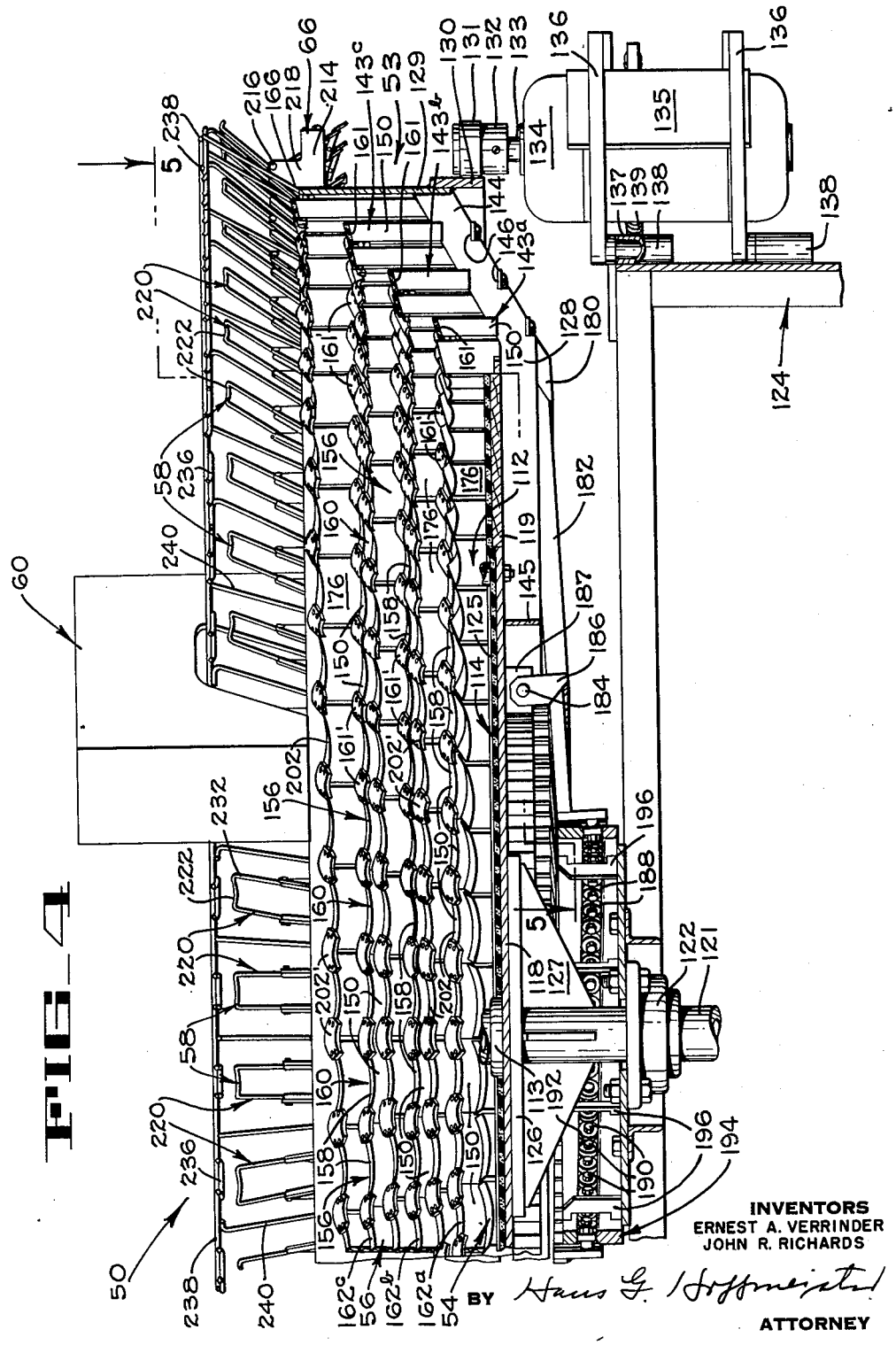

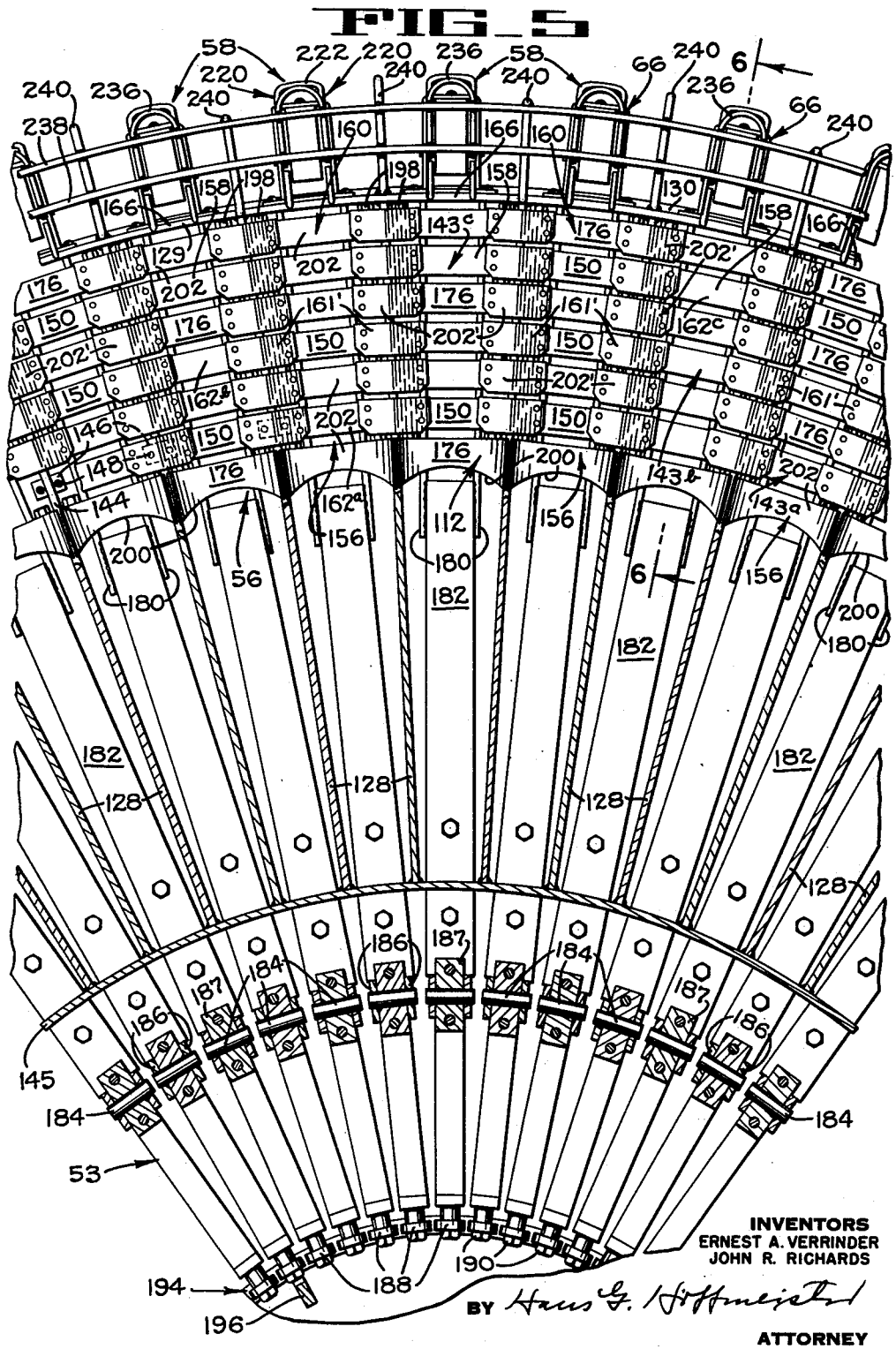

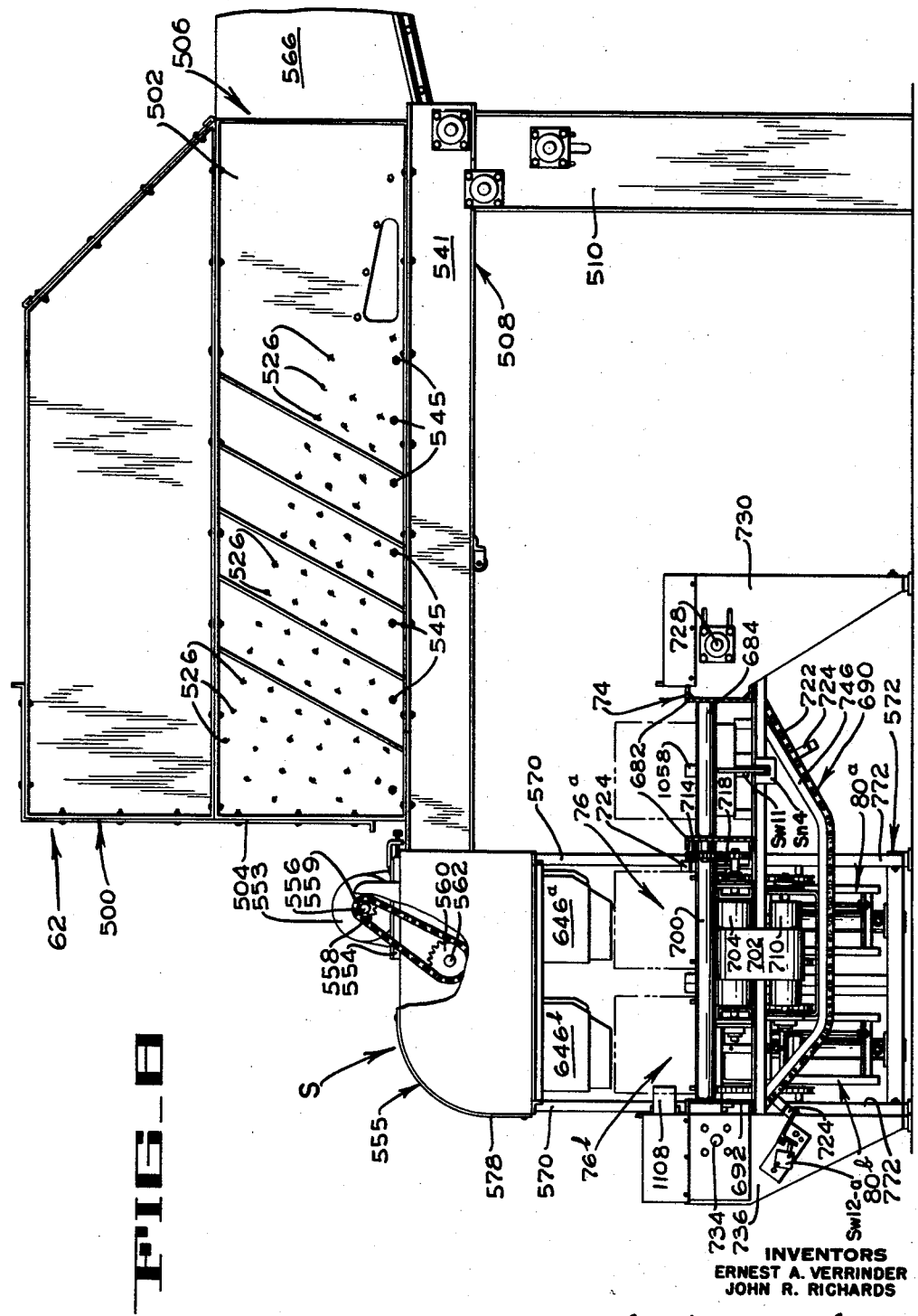

Sept. 15, 1964   E. A. VERRINDER ETAL   3,148,774
ARTICLE HANDLING METHOD AND APPARATUS
Filed Aug. 23, 1956   21 Sheets-Sheet 8
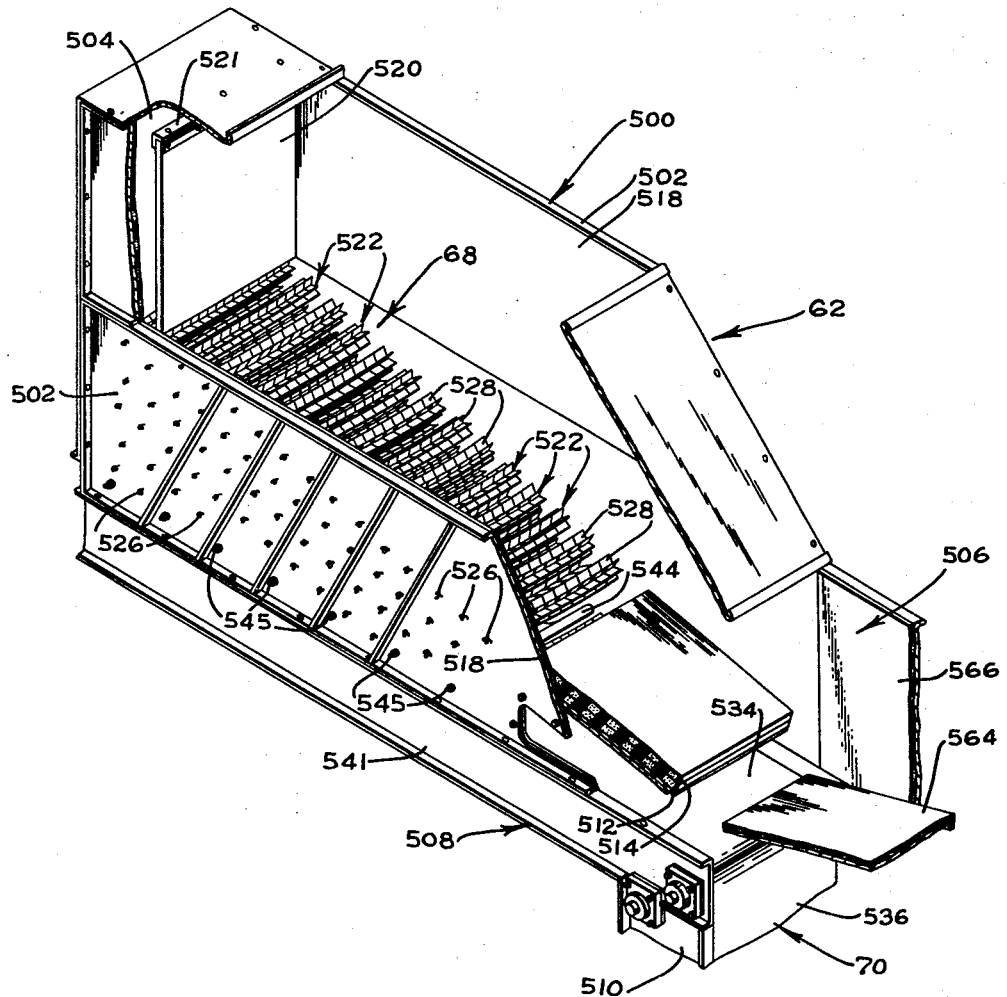
FIG_9
INVENTORS
ERNEST A. VERRINDER
JOHN R. RICHARDS
BY *Hans G. Hoffmeister*
ATTORNEY

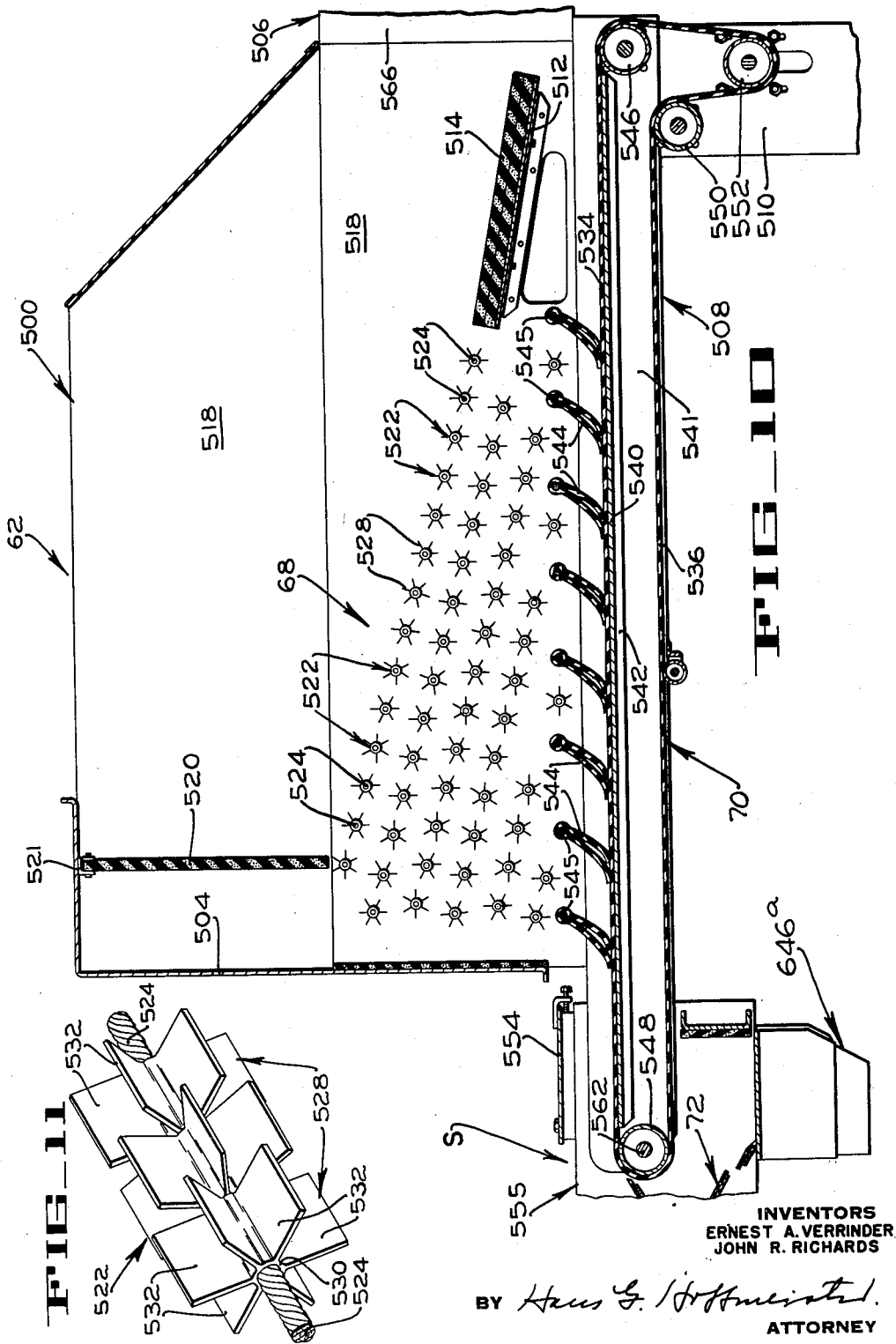

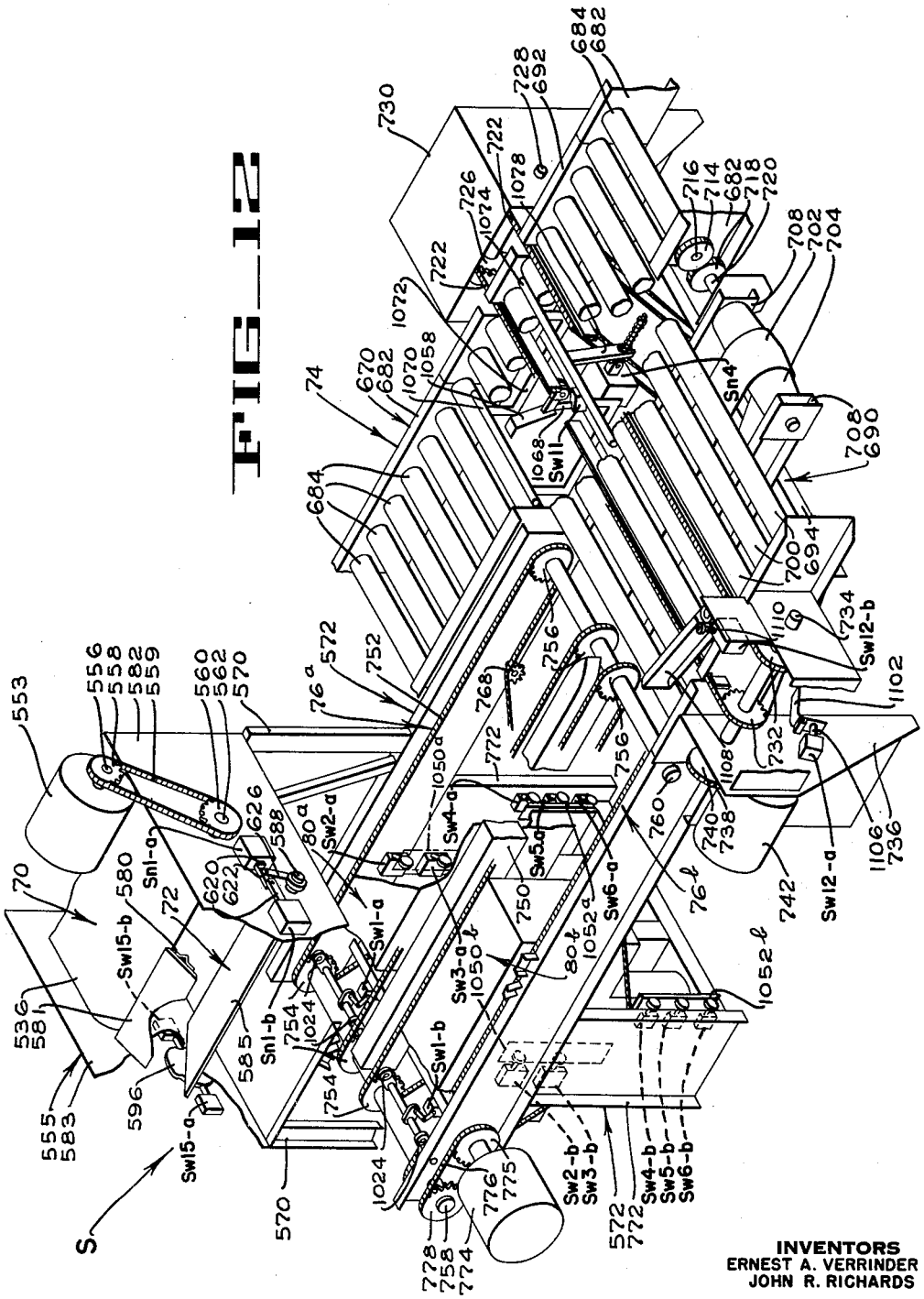

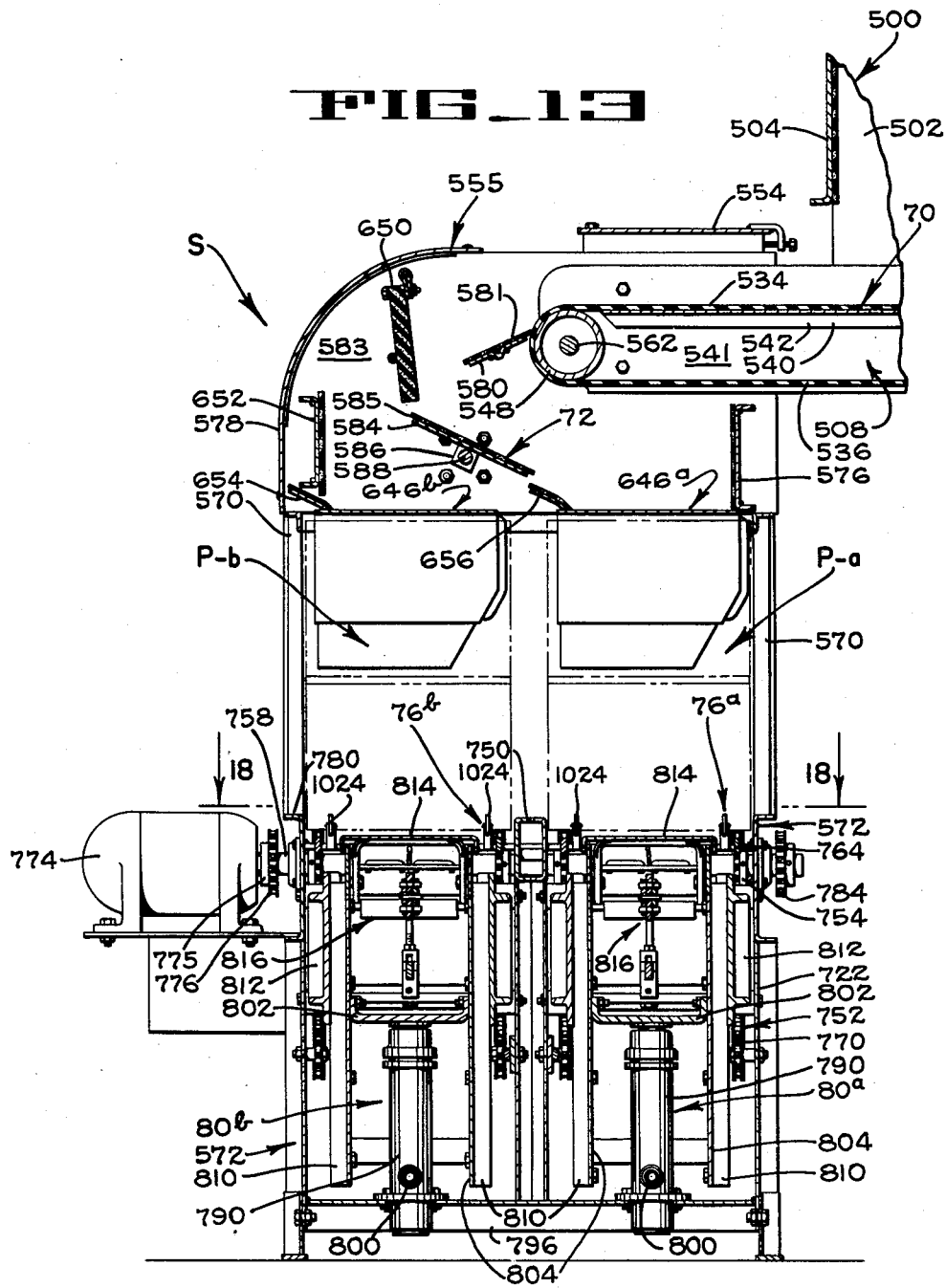

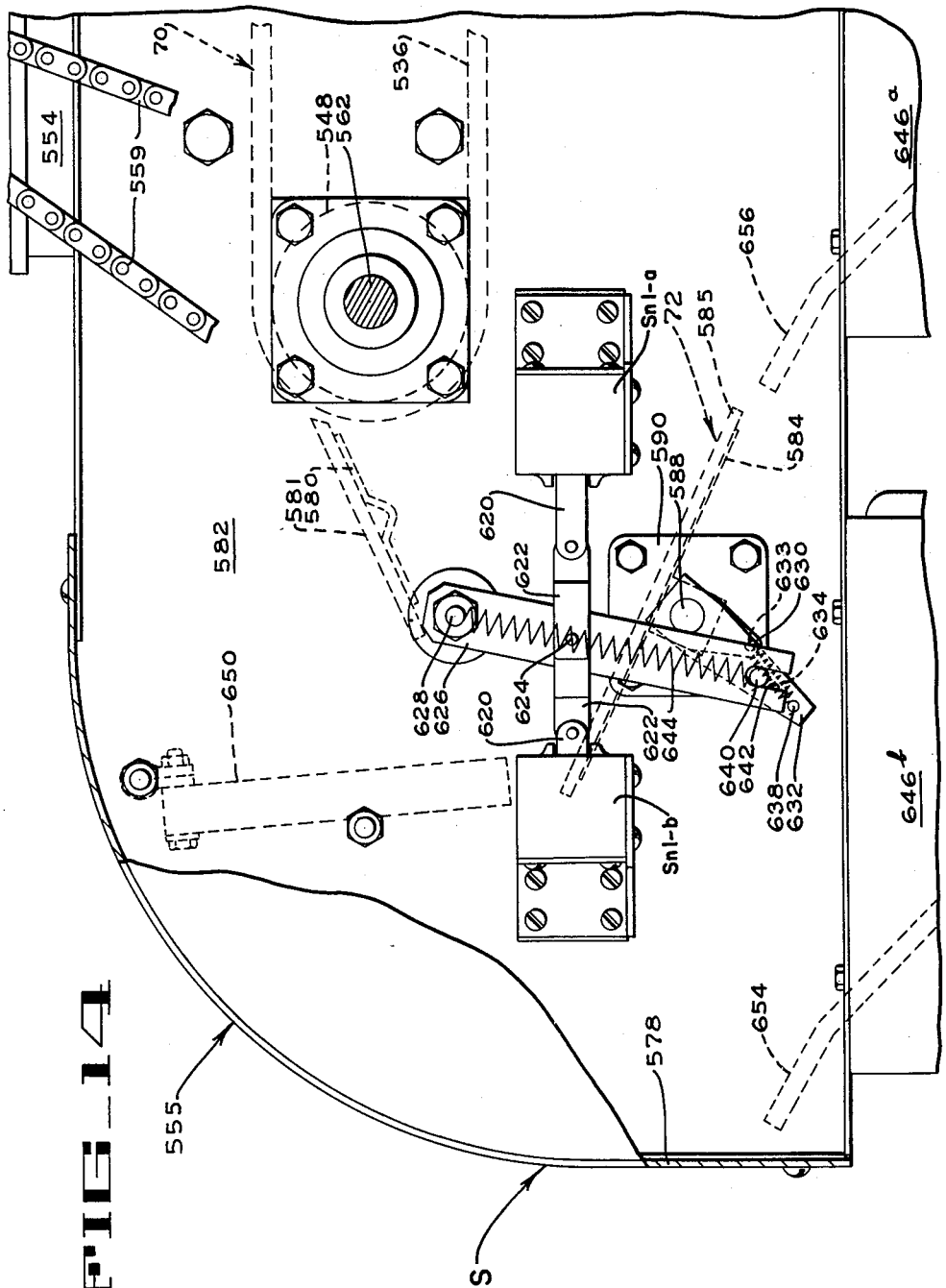

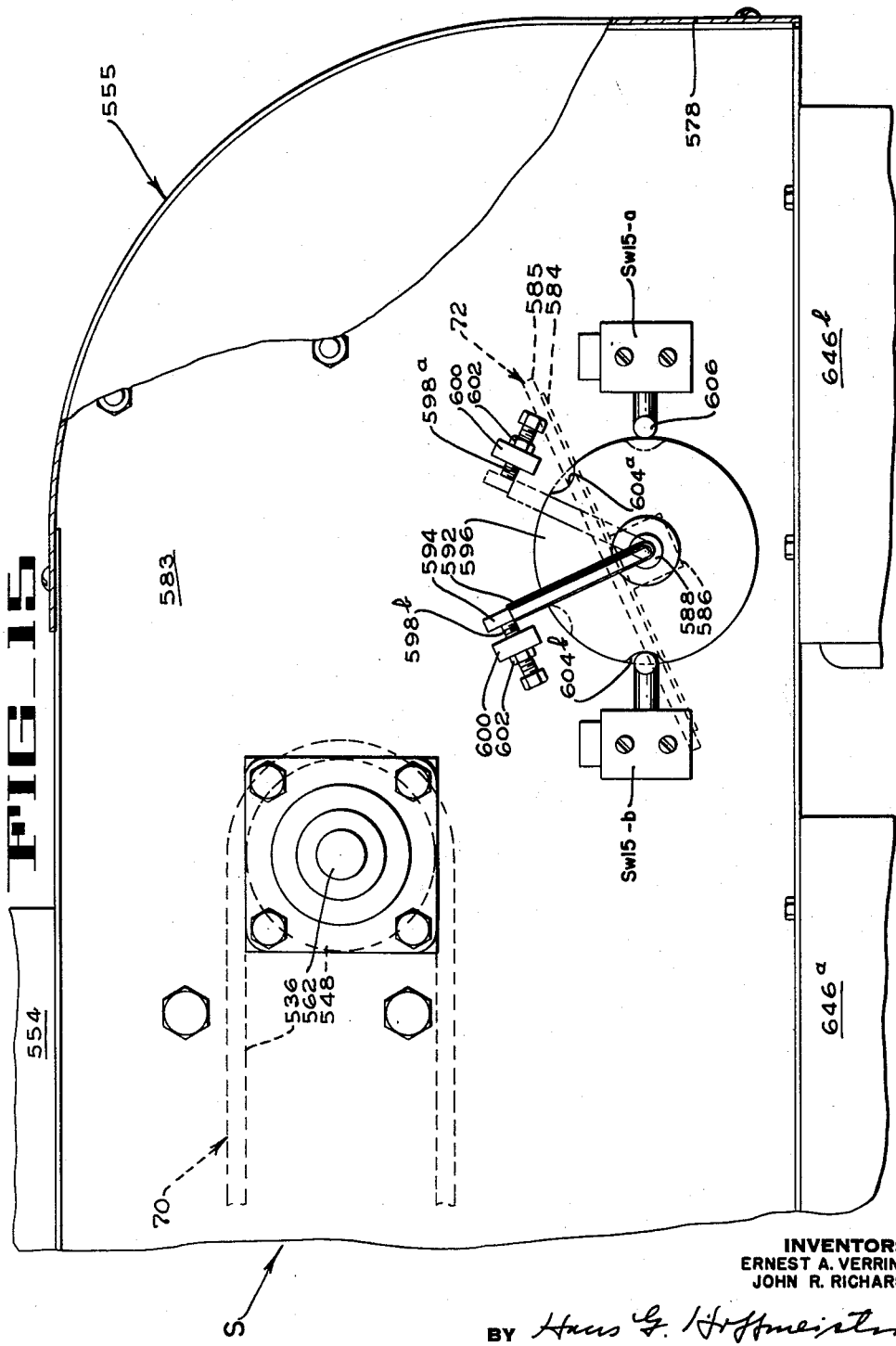

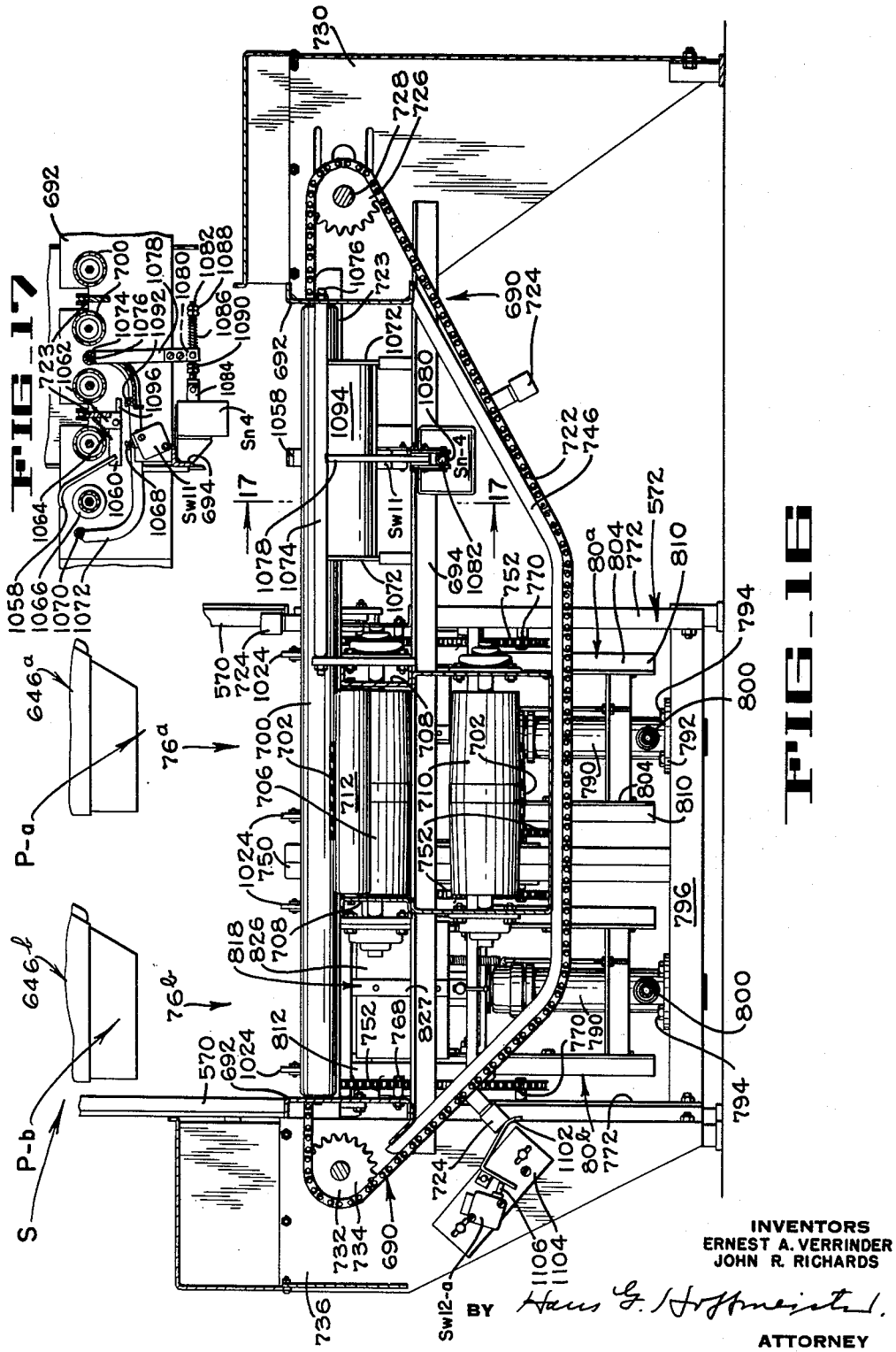

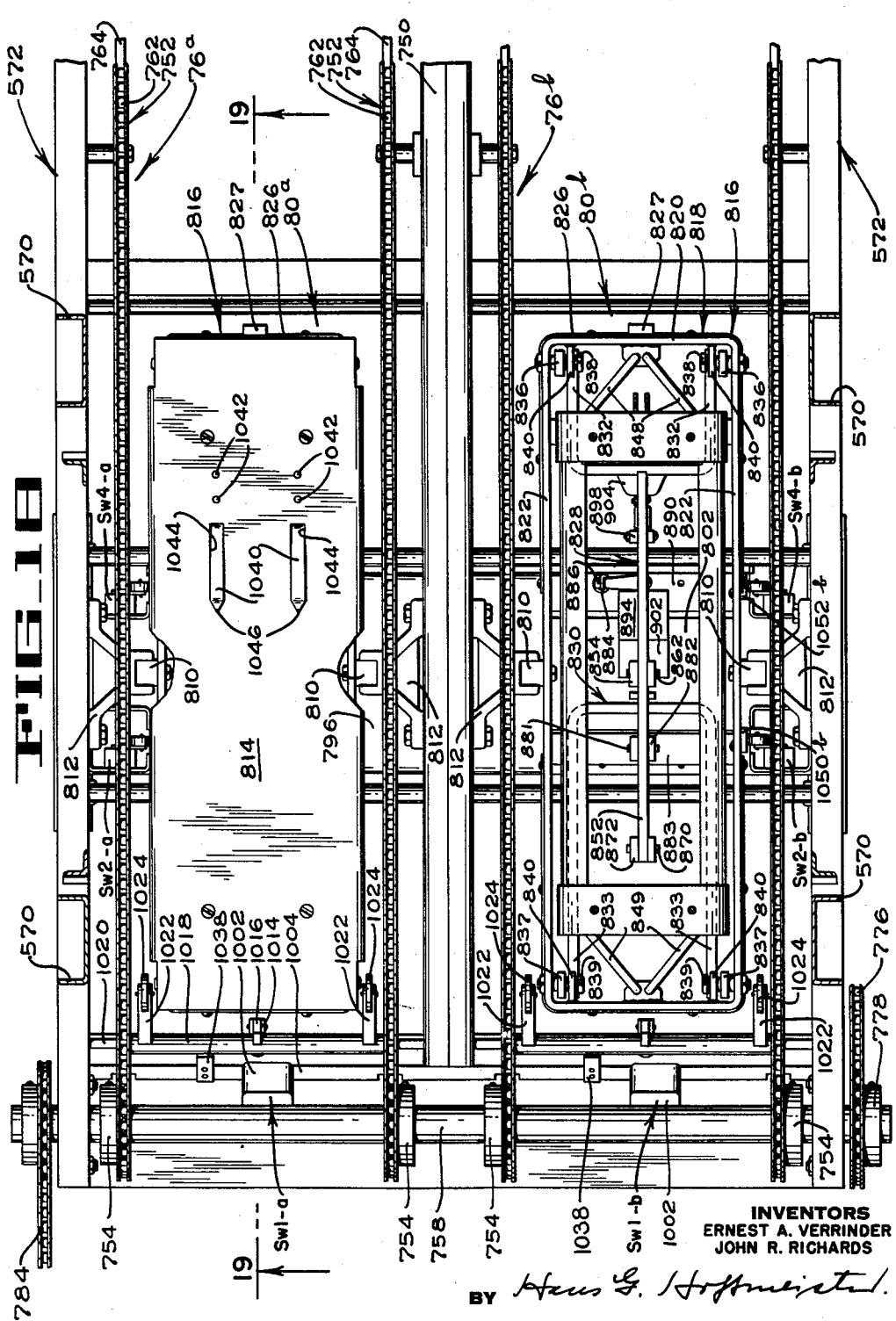

Sept. 15, 1964   E. A. VERRINDER ETAL   3,148,774
ARTICLE HANDLING METHOD AND APPARATUS
Filed Aug. 23, 1956   21 Sheets-Sheet 16
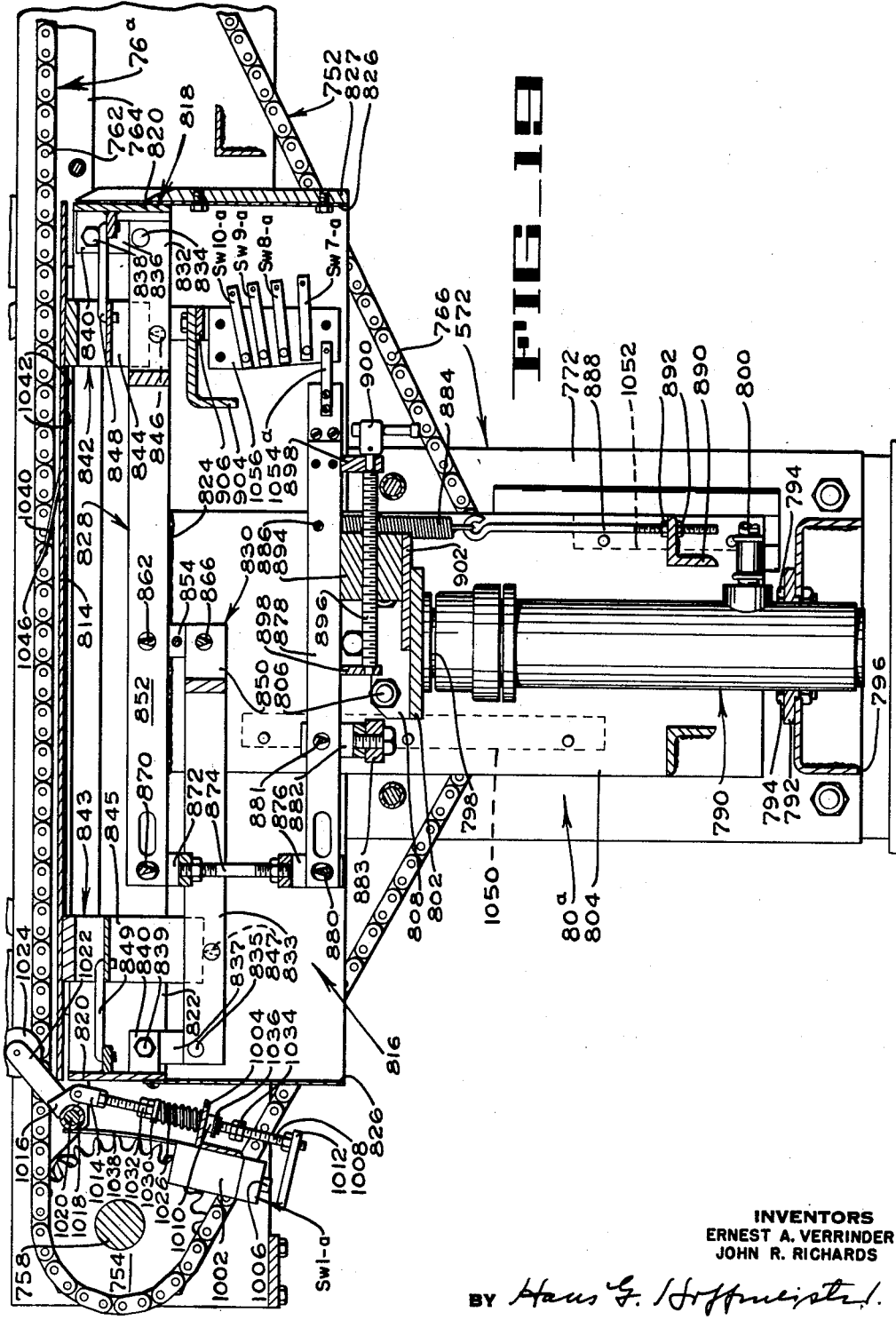
INVENTORS
ERNEST A. VERRINDER
JOHN R. RICHARDS
BY Hans G. Hoffmeister
ATTORNEY

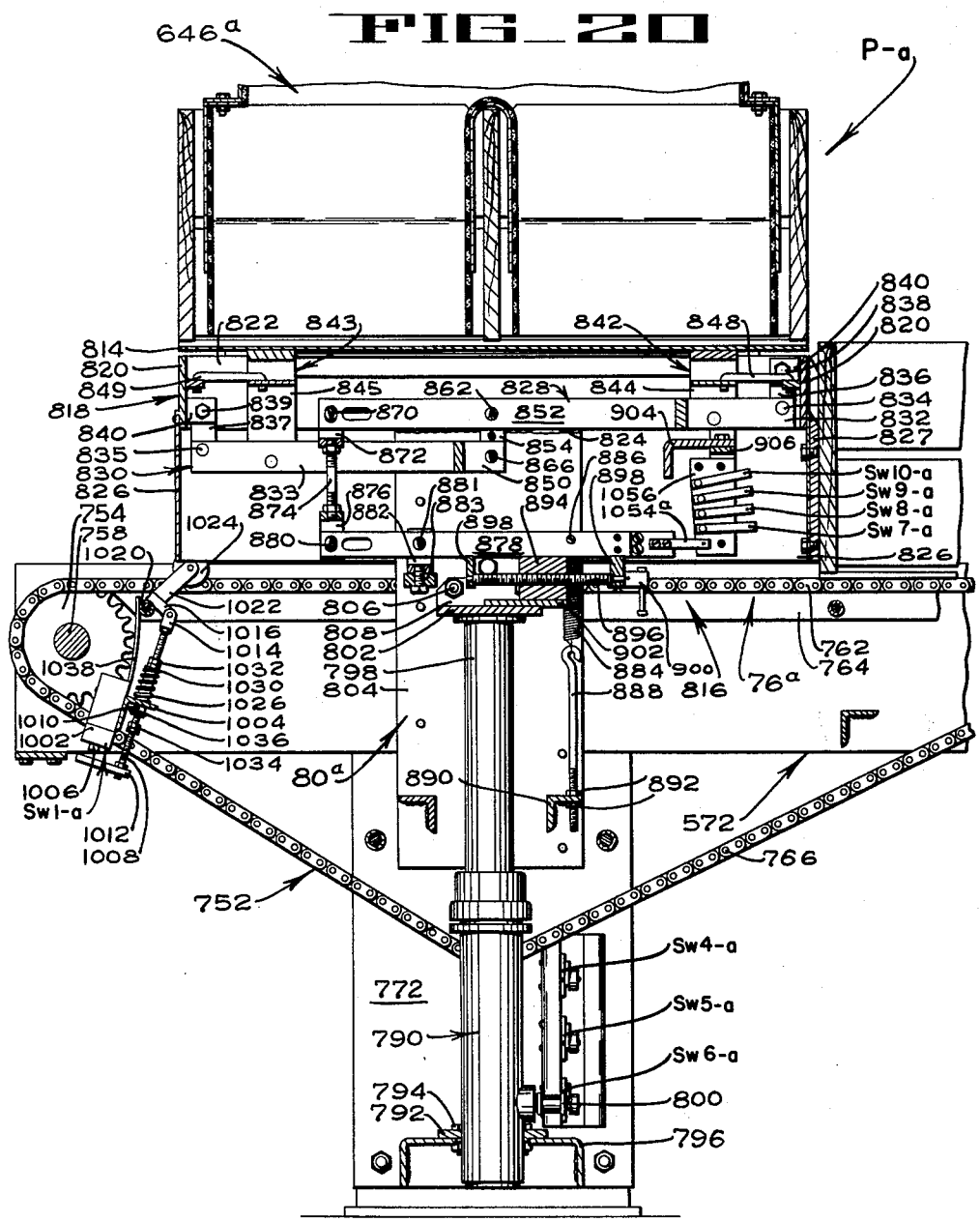

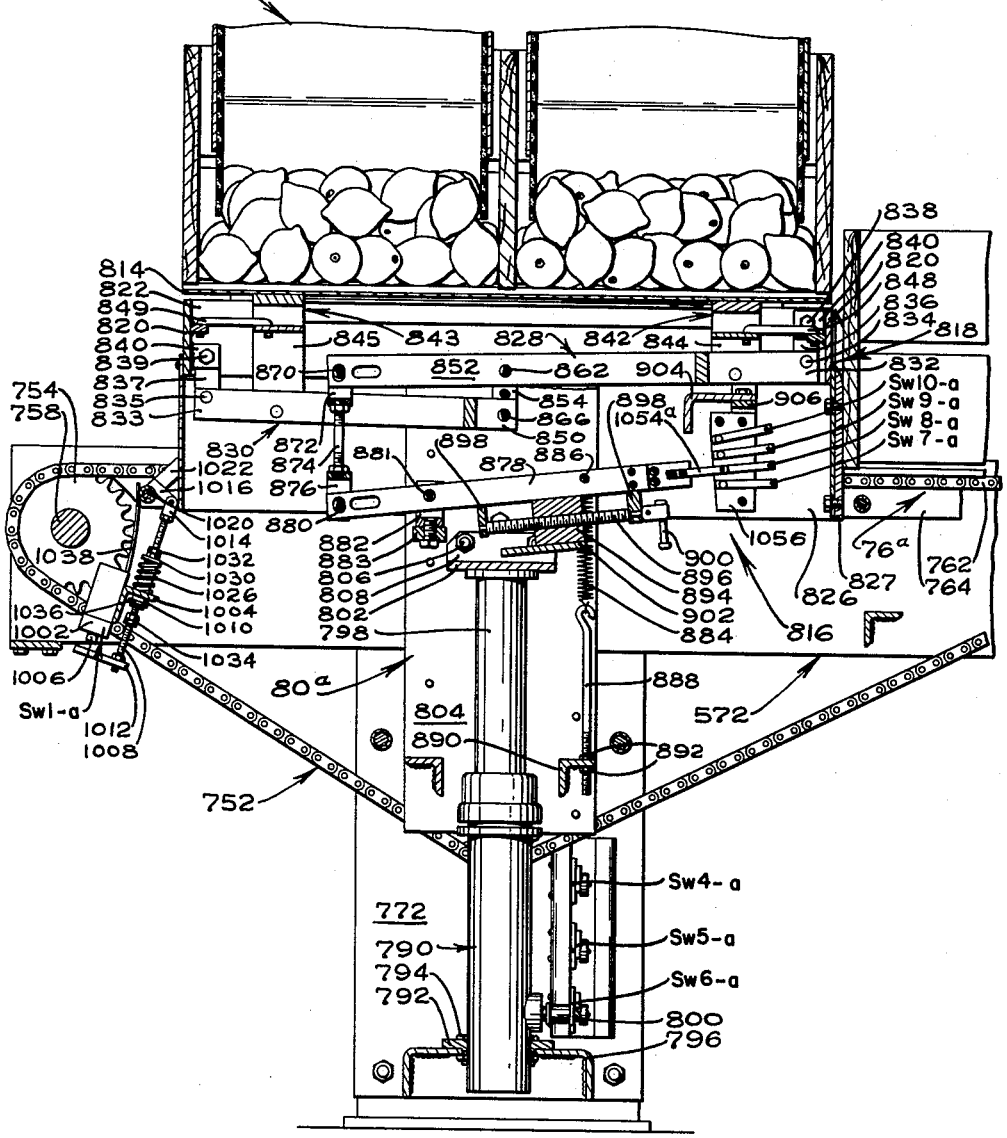

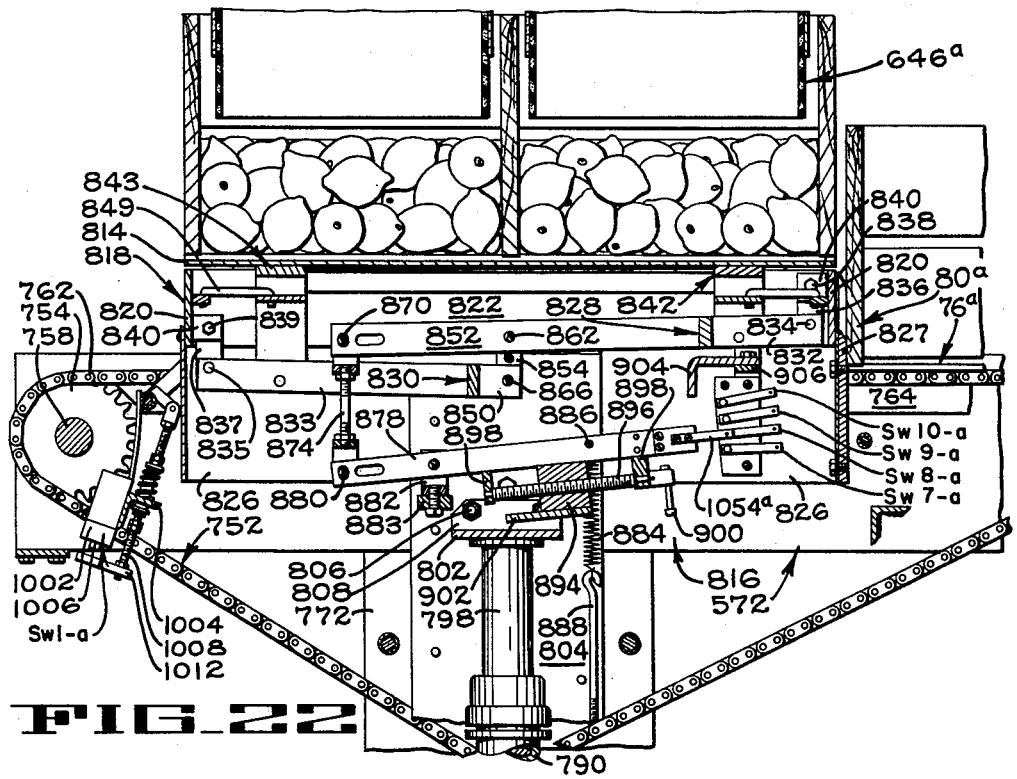
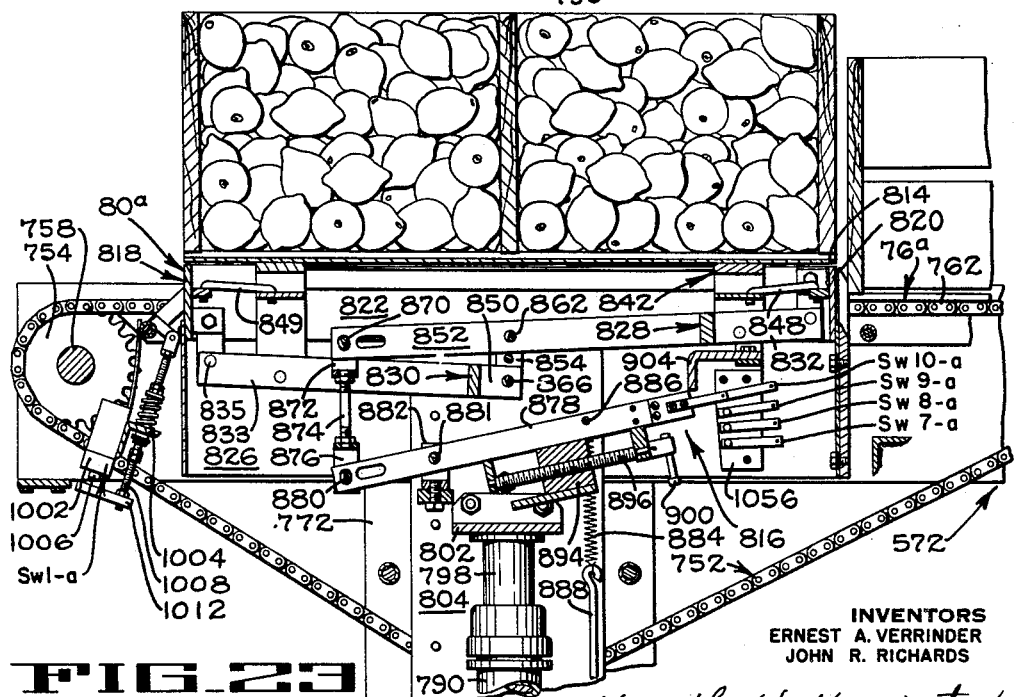

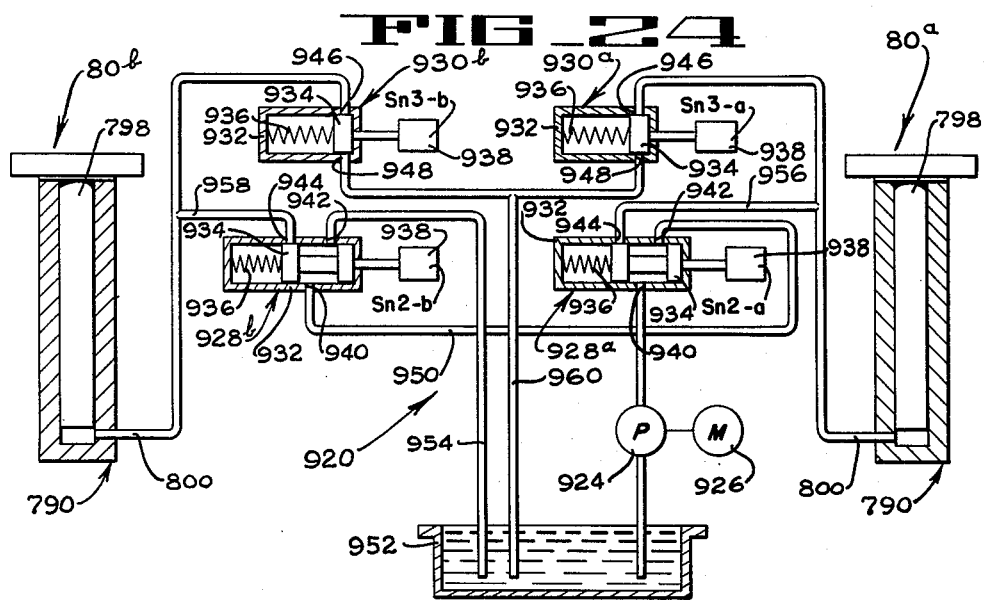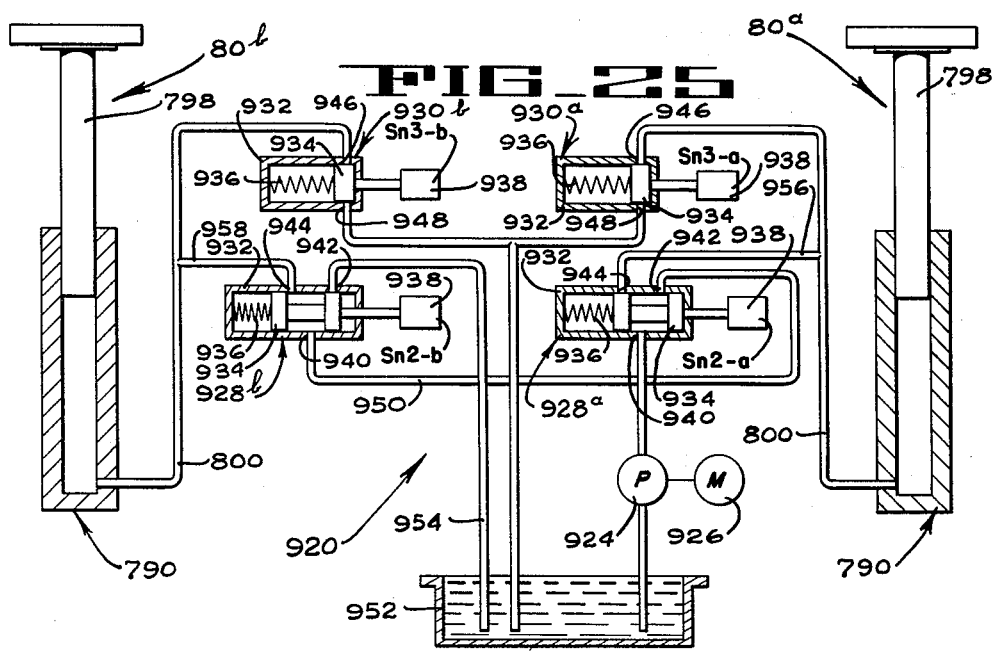

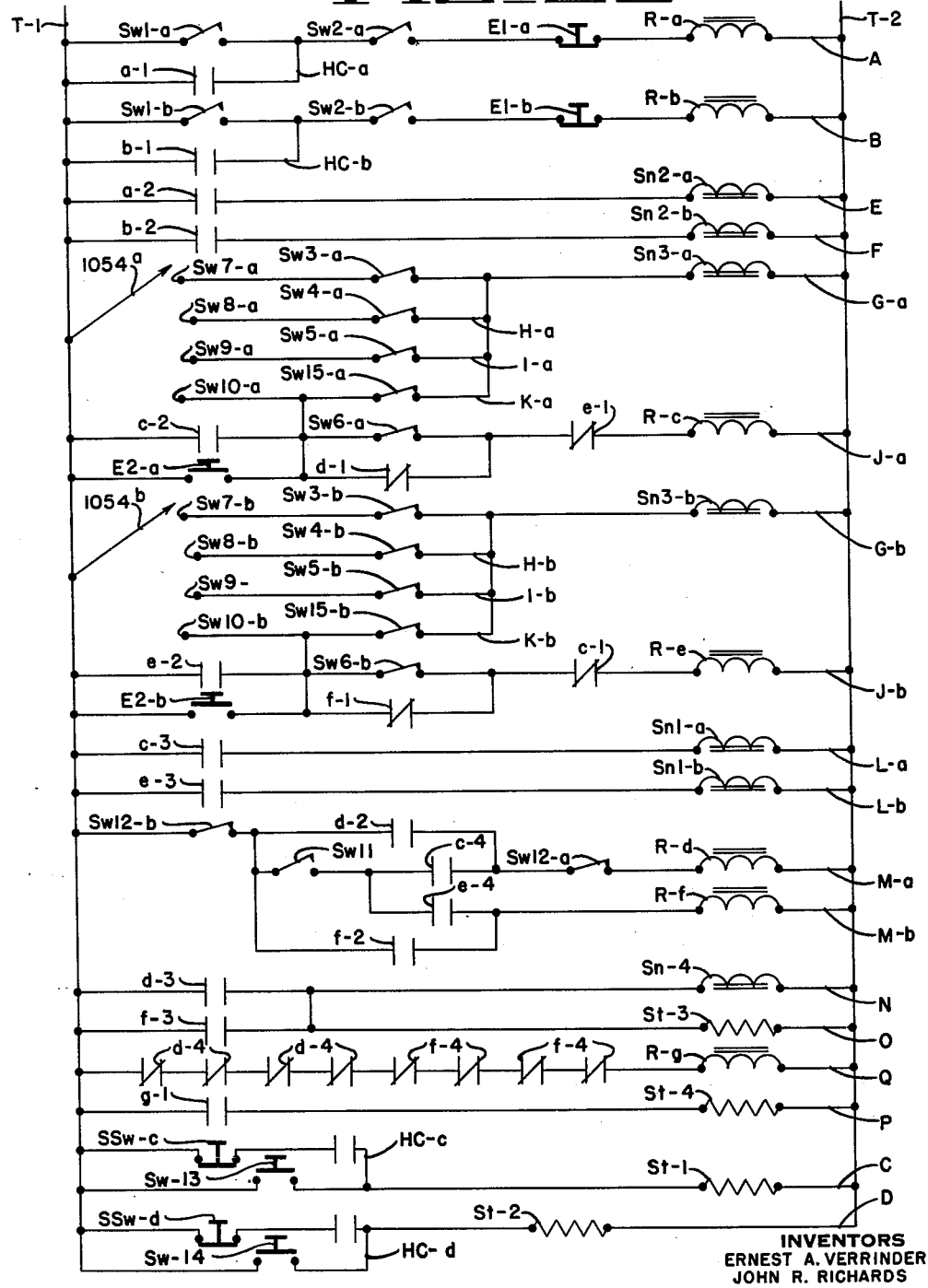

United States Patent Office 3,148,774
Patented Sept. 15, 1964

3,148,774
ARTICLE HANDLING METHOD AND
APPARATUS
Ernest A. Verrinder and John R. Richards, Riverside, Calif., assignors to FMC Corporation, a corporation of Delaware
Filed Aug. 23, 1956, Ser. No. 605,797
41 Claims. (Cl. 209—73)

Ths invention relates to article handling methods and apparatus, and more particularly to methods and machines for sorting articles.

An object of the invention is to provide an improved method of handling articles to sort a promiscuous lot of the articles into a plurality of groups or classifications.

Another object is to provide an improved method of sorting articles of a delicate or easily injured nature.

Another object is to provide a sorting machine capable of operating at high speed to classify and sort a great number of articles per unit of time.

Another object of the invention is to provide a continuously operating sorting machine capable of maintaining indefinitely a high rate of output.

Another object is to provide an improved method of sorting articles supplied either in a continuous stream or in a rapid succession of separate lots, whereby the articles are inspected individually, separated into groups or classifications according to distinguishing characteristics detected during such inspection, and filled into boxes so that each box contains a predetermined quantity of the articles whose said distinguishing characteristics fall within the same category.

Another object is to provide a machine for performing the method of the invention in a manner particularly adapting the same to sort articles of a delicate and easily injured nature, such as fruit in a ripe or nearly ripe condition.

Another object is to provide a method of sorting articles apt to be injured by rough handling, and of filling the sorted articles into boxes in a continuing, high speed operation whereby large quantities of the articles are handled rapidly and yet so gently that bruising or other injury of the articles is minimized.

Another object of the invention is to provide apparatus for making a supply of empty boxes constantly and instantly available for the reception of product sorted in accordance with the method or by the apparatus of the invention, for discharging each filled box from the apparatus upon reception therein of the desired quantity of sorted product, and for replacing the discharged filled boxes with empty boxes so promptly as to avoid interference with the machine's continuity of operation.

Other objects and advantages of the invention will become apparent from the following description and the drawings in which:

FIGURE 2 is a vertical enlarged section taken along lines 2—2 of FIG. 1.

FIGURE 3 is a fragmentary enlarged section similar to FIG. 2, certain parts being broken away.

FIGURE 4 is an enlarged fragmentary section taken along lines 4—4 of FIG. 1.

FIGURE 5 is an enlarged fragmentary section taken along lines 5—5 of FIG. 4.

FIGURE 6 is an enlarged fragmentary section taken along lines 6—6 of FIG. 5.

FIGURE 7 is a fragmentary detail in perspective showing one of the receivers wherein the lemons are advanced for individual inspection.

FIGURE 8 is an enlarged elevation of one of the receptors into which the sorted lemons are discharged and the box filling station associated therewith, viewed in the direction of arrow 8 of FIG. 1.

FIGURE 9 is a fragmentary perspective of the receptor of FIG. 8, partially broken away.

FIGURE 10 is a fragmentary vertical section taken longitudinally of the receptor along lines 10—10 of FIG. 1.

FIGURE 11 is an enlarged fragmentary perspective of one of the lemon decelerating units of the receptor of FIGS. 8, 9 and 10.

FIGURE 12 is an enlarged diagrammatic perspective of one of the box filling stations and the conveyor mechanisms associated therewith for supplying the filling station with empty boxes, viewed in the direction as indicated by arrow 12 of FIG. 1, and showing the location of the various automatic controls of the apparatus.

FIGURE 13 is an enlarged fragmentary section of the box filling station of FIG. 12 taken along lines 13—13 of FIG. 1.

FIGURE 14 is an enlarged side elevation partially broken away of the upper part of the box filling station of FIG. 13 viewed in the direction of arrow 14 of FIG. 1.

FIGURE 15 is an elevation similar to FIG. 14 showing the opposite side of the upper part of the filling station, viewed in the direction of arrow 15 of FIG. 1.

FIGURE 16 is an enlarged section taken along lines 16—16 of FIG. 1 showing the box intercepting conveyor associated with the box filling station of FIG. 8.

FIGURE 17 is a fragmentary section taken along lines 17—17 of FIG. 16.

FIGURE 18 is an enlarged horizontal section taken along lines 18—18 of FIG. 13 and partly broken away, showing the two elevator mechanisms associated with the box filling station of FIG. 8.

FIGURE 19 is an enlarged fragmentary section taken along lines 19—19 of FIG. 18, showing a box elevator in fully retracted position.

FIGURE 20 is a side elevation of the elevator mechanism of FIG. 19 showing the elevator in fully raised position and supporting a box in readiness to receive sorted lemons.

FIGURES 21, 22 and 23 are views similar to FIG. 20 showing the elevator mechanism in successive stages of operation.

FIGURES 24 and 25 are diagrams of the hydraulic mechanism for actuating the elevators of the box filling station of FIG. 8, in different stages of operation.

FIGURE 26 is a diagram showing the electrical connections and controls of the automatic box handling apparatus of the present invention.

Figure 1:
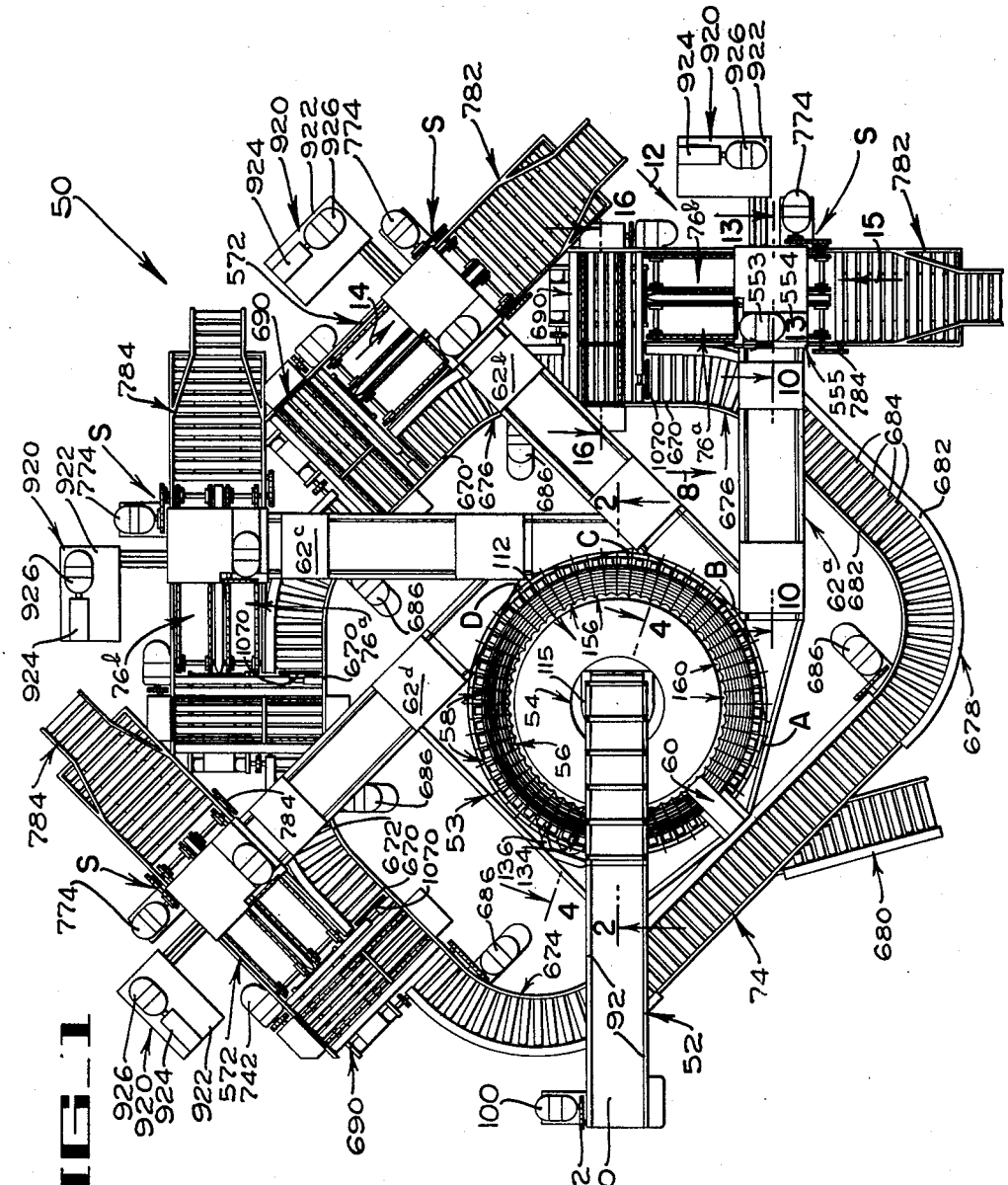
FIGURE 1 is a plan of a machine for sorting lemons by the method of the present invention.

The method and the apparatus of the present invention are capable of adaptation to the sorting of many different types of articles that can be handled in bulk and require separation according to distinguishing characteristics of the individual articles, such as color. Although the illustrated embodiment of the invention is a machine for sorting lemons into various color classifications, the invention is not restricted to use in connection with fruit. Consequently, the illustration and description of the apparatus of the invention herein in the form of a machine for sorting lemons are to be considered as exemplary rather than in a limiting sense.

For a general description of the lemon sorting machine 50 of the present invention, reference is made to FIG. 1, which illustrates the sorting machine 50 as including a supply conveyor 52 adapted to feed lemons to be sorted into the machine. The lemons thus supplied to the machine are usually in a heterogeneous mixture of indiscriminately distributed lemons of the several colors according to which lemons are classified in commercial practice. The conveyor 52 discharges the unsorted lemons into a feeding mechanism 53 that arranges the lemons into single file procession and accelerates them to a linear velocity adequate to enable the sorting machine to achieve a satisfactory output capacity. The feeder 53 includes a rotating receptacle 54 which functions as a centrifuge to effect dispersion and acceleration of the lemons. The rim section 56 of the centrifuge recepticle is designed to so control the motion of the lemons within the receptacle 54 that they accelerate gradually in a succession of relatively gentle steps, thus avoiding the rough and injurious treatment of the lemons that would be apt to result from abrupt acceleration to the desired velocity. The lemons are released from the rim section 56 of the receptacle 54 to receivers 58 that are carried by the centrifuge receptacle 54 and which are aligned in a circular series concentric with the same. Release of the lemons to the receivers 58 is so controlled during movement of the lemons across the rim section 56 that the lemons enter the receivers individually, thereby disposing a single lemon in each receiver. Consequently, as the lemons leave the centrifuge receptacle 54, they are aligned and advanced at the desired velocity in a single file procession moving in a circular path above and just outside the rim section 56 of the receptacle. While thus moving in an arcuate path, the lemons are presented singly and in rapid succession to an electronic inspecting device 60 that is capable of distinguishing between lemons of the different color classifications into which the lemons are to be sorted, and which is adapted to emit a distinctive electrical impulse individual to each of the several color classifications. A plurality of receptors 62–a, 62–b, 62–c and 62–d are arranged at spaced intervals about the circumference of the rotary receptacle 54, just outside the circular path of the receivers 58. These receptors, which will be referred to collectively herein as the receptors 62, are arranged in positions to receive lemons released from the receivers 58 at certain points of their circular path at progressively greater distances from the inspecting device 60, which, through a suitable system of electric circuits (not shown) and a memory device 64 (FIGS. 2 and 3), selectively actuates tripping devices 66 (FIGS. 2, 4, 5, 6, and 7) to effect release of the lemons from their circular path into the particular receptors 62 appropriate to the respective color types of the lemons.

Due to the velocity at which the lemons are moving at the instant of their release from the receivers 58, each lemon is thrown from its receiver 58 in a nearly horizontal trajectory that extends tangentially from the circular path of the receivers 58 into the open mouth of a receptor 62. Each receptor 62 (FIGS. 1, 2, 8, 9, and 10) is equipped with means for gradually decelerating the lemons so as to avoid their being damaged by impinging with excessive force against walls of the receptor 62. The decelerating means of each receptor 62 includes a labyrinth 68 (FIGS. 9 and 10) of yieldable, flexible members between which the lemons gravitate and from which they drop gently onto a conveyor 70 by which all the lemons of the particular color group collected by the receptor 62, are discharged at a box-filling station S, (FIG. 1) one of which is provided for each receptor.

At each box-filling station S, two boxes are normally arranged in position to receive the lemons from the associated conveyor 70, into one of which the lemons are guided until the box has received the desired quantity of lemons, whereupon a movable deflector 72 is automatically adjusted to deflect the lemons into the other box. When one box is filled with lemons and upon adjustment of the deflector 72 to direct the lemons into the other box, the filled box is automatically discharged from the box-filling station S, and an empty box is substituted therefor, so that it is in readiness to start receiving lemons whenever the desired quantity of lemons accumulates within the said other box. A supply of empty boxes is constantly available on an endless distributing conveyor 74 (FIG. 1) whereby empty boxes are circulated past all of the box-filling stations S. Whenever a filled box is removed from loading position, an empty box is automatically withdrawn from the distributing conveyor 74, and moved onto one of two box filler conveyors 76–a or 76–b which are provided for each box-filling station, so that an empty box is always in readiness to be instantly substituted for a filled box upon discharge of the filled box from loading position. Elevator mechanisms 80–a and 80–b are associated with the filler conveyors 76–a and 76–b, respectively, and each is adapted to raise a single box from the associated filler conveyor into position to receive lemons from the associated receptor conveyor 70 and to gradually lower the box as the quantity of lemons accumulated therein increases, so that regardless of the depth to which a box is filled, the lemons are permitted to fall through but a minimum distance from the guide mechanism 72, thus minimizing any tendency for the lemons to be bruised as a consequence of their falling by gravity into the box.

*Lemon Feeding Apparatus 53*

The lemon feeding apparatus 53 (FIGS. 1–7) is adapted to receive lemons to be sorted at a high average rate and either in a continuous flow or intermittently in successive lots each consisting of a quantity of lemons such as that commonly contained in a field box of the type used for conveying recently picked lemons from orchard to packing house. The lemons are introduced to the apparatus by the supply conveyor 52 which includes an endless conveyor belt 90 which operates between spaced parallel side walls 92 that extend above the plane of the upper run of the belt 90 to prevent lemons from rolling laterally off the same. The upper run of the belt 90 is slidably supported on a plate 94 (FIG. 3) having edge flanges 96 whereby the plate 94 is secured to the side walls 92; and since at least the inner or discharge end of the conveyor 52 slopes downward as it approaches the feeding apparatus 53, it is provided with means for restraining lemons from rolling down the sloping conveyor faster than the speed of the belt 90. This restraining means comprises a series of spaced flaps 98 of flexible material suspended by their upper edges above the conveyor at such height that their lower edges can rest loosely on the upper run of the conveyor and hence frictionally engage lemons thereon. The belt 90 is driven at suitable speed by a motor 100 (FIG. 1) whose drive shaft is connected by a belt or chain 102 to one of the pulleys 104 (only one of which is shown, FIG. 2) around which the belt 90 is trained at opposite ends of the conveyor 52. Preferably the lower run of the conveyor is supported so as to prevent excessive sagging thereof, by a series of idler rollers 106 freely journalled on shafts 108 extending between the side walls 92.

The unsorted lemons discharged from the supply conveyor 52, gently roll or slide across an apron 110 (FIGS. 1, 2 and 3) secured to the side walls 92 of the conveyor 52. The apron 110 slopes downward into a generally horizontal receptacle or bowl 112 (FIGS. 1–6) wherein the lemons are dispersed from the conglomerate or orderless massing thereof in which they are introduced to the apparatus. The discharge end of the supply conveyor 52 receives support from a cap 113 secured to the bottom 114 of the bowl 112 at the center of the same. A circular shield 115 that prevents lemons from rolling to the center of the bowl 112 is supported on the cap 113 by a pin 116 (FIG. 3) rigid with and extending downward from the center of the shield 115 and journalled within a socket 117 in the upper surface of the cap 113. The lower ends of the side walls 92 of the conveyor 52 are welded or otherwise secured to the shield 115 which thus transmits to the cap 113 the weight of the lower end of the conveyor 52 and of the fruit thereon.

The bottom 114 of the bowl 112 is of circular form, and includes a circular central portion 118 of metal and an outer, annular portion 119 (FIGS. 2 and 4) in planar alignment therewith and preferably of a lighter material, such as wood or plastic. The bowl 112 is carried by a shaft 121 that is freely journalled in bearings 122 and 123 mounted in vertical alignment in a suitable supporting frame 124. The lower bearing 123 is a combined radial and thrust bearing adapted to sustain the combined weight of the bowl 112, the lower end of the supply conveyor 52, and their contents. The bottom 114 of the bowl 112 is covered by a cushioning pad or mat 125 of suitable resiliently yieldable material such as sponge rubber, to protect lemons from injury by bruising or scuffing during or subsequently to their introduction to the bowl 112. A bowl supporting flange 126 rigid with the shaft 121 at the upper end thereof, and preferably reinforced by gussets 127 is secured to the under surface of the central portion 118 of the bowl bottom 114 coaxially of the same. A plurality of radially extending ribs 128 welded at their inner ends to the under surface of the central portion 118 of the bowl bottom 114 support at their outer ends an upstanding cylindrical rim 129 with its axis coinciding with that of the shaft 121. A drive flange 130 is secured to and extends downward from the rim 129. The drive flange 130 is engaged by a friction band 131 (FIGS. 4 and 6) on a driving pulley 132 that is rigid with the shaft 133 of a motor 134. The motor 134 is carried by a bracket 135 rigid with the outer ends of two parallel arms 136 having vertical, axially aligned pivot pins 137 rigid with their inner ends. The pins 137 are pivotally seated within hubs 138 rigid with the frame 124 so that a spring 139 (FIGS. 2 and 4) under tension between the bracket 135 and a suitable portion of the frame 124 constantly causes the friction band 131 on the pulley 132 to maintain frictional driving engagement with the drive flange 130 so that when the motor 134 is operated the bowl 112 is caused to rotate at constant angular velocity about its central vertical axis.

Two results are achieved through rotation of the bowl 112: (1) lemons within the bowl start to revolve therewith, as a consequence of their frictional engagement with the pad 125, and the lemons are thus impelled radially outward of the bowl by centrifugal force, dispersing the lemons from the relatively closely spaced grouping thereof in which they are introduced to the bowl, and (2) each lemon successively engages parts of the bowl whose linear velocities are progressively greater as their distance from the axis of bowl rotation increases. The bowl is provided with a series of flaps 140 (FIGS. 2 and 3) of flexible sheet material, each suspended at its upper edge from a frame 141 supported from the bottom of the bowl 112 by a plurality of legs 142. The flaps 140 are of annular form and are arranged concentrically of the bowl 112 with their lower edges draped loosely on the upper surface of the pad 125. Accordingly, as each lemon moves radially outward, it is frictionally engaged by each of a succession of the flaps 140, which thus materially prolongs the time required for the lemon to traverse the flat bottom of the bowl. This permits the lemons to acquire more nearly the angular velocity of the bowl before they reach the rim section 56.

The rim section 56 of the bowl (FIGS. 1, 2 and 4–6) is provided with means for keying lemons to the bowl so as to positively drive the lemons at the same angular velocity as that of the bowl itself. This keying means includes a series of upstanding circular rims 143–a, 143–b and 143–c of progressively greater diameter in the order named. These rims, which are fixed with relation to the bowl, will be referred to as the rims 143 when mentioned collectively hereinafter. The rims 143 are disposed inside the rim 129 previously mentioned and are disposed in concentric relation with each other with their common center lying within the axis of bowl rotation. The rims 143 are supported upon upwardly and outwardly inclined outer parts 144 of the ribs 128. The inner ends of the ribs are welded to a cylindrical flange 145 which is welded to the under surface of the central portion 118 of the bowl bottom 114. A plurality of transversely extending plates 146 are welded to the outer part 144 of each rib 128, each plate 146 being seated within a notch in the lower edge thereof (FIG. 6). Each plate 146 projects laterally to both sides of the associated rib 128 far enough to permit screws 148 to extend therethrough adjacent both sides of the associated ribs.

As illustrated in the drawings, each rim 143 comprises a circular series of identical blocks 150 arranged in closely spaced relation in a circular pattern to define the associated rim, although each rim 143 could be of continuous form throughout larger parts or all of its extent. Each block 150 is slightly wider than the space between the two adjacent ribs 128 at the radial portion thereof at which the block is mounted, so that shoulders 152 (FIG. 6) formed in the lateral edges of the block can seat upon horizontal steps 154 formed by notches in the upper edges of the inclined portions 144 by two adjacent ribs 128. Each block 150 is secured to its two associated ribs 128 by two of the aforementioned screws 148 extending upward through the adjacent ends of two of the plates 146 and threaded into the bottom of the block so that when the screws 146 are tightened the block is firmly seated in an erect position with its shoulders 152 drawn down against the two associated steps 154.

Each of the several rims 143 includes the same number of blocks 150 and the blocks of the several rims 143 are arranged in a plurality of radially extending rows 156 (FIGS. 1, 2, 4 and 5) disposed in closely spaced arrangement in the rim section 56 of the bowl 112. Each radial row 156 includes a single block 150 of each rim 143, all of which blocks are in radial alignment with each other. The upper edge 158 of each block 150 inclines upward and radially outward of the bowl, and is formed with a concavity or depression describing an arc extending substantially from one lateral edge of the block to the other. Thus, the several concave upper edges 158 of the several blocks 150 comprising a single radial row 156 cooperate to define a channel 160 extending radially of the bowl 112. Each channel 160 is of slightly greater width than the average length of the axes about which the lemons roll in travelling along the channel 160. Consequently, each channel is adapted to accommodate a single file procession of lemons progressing radially outward of the bowl 112 while the higher shoulders 161 (FIGS. 4 and 6) of the associated blocks 150 at the lateral edges of the same restrain lemons other than those constituting the single file procession within the channel. The efficiency of the shoulders 161 in restricting the channels 160 so that only a single file procession of lemons can progress through each channel is enhanced by flexible rubber pads 161' (FIGS. 2, 4, 5, and 6) each of which is secured to the shoulders 161 of two adjacent blocks 150. In effect, therefore, the pads 161' increase the depth of the channels 160 and decrease their width.

The parts are so proportioned and arranged that the upper edges 158 of the blocks 150 of each radial row 156 are progressively higher from the innermost to the outermost block (FIGS. 2, 4 and 6). Hence, the radial channels 160 incline upwardly and outwardly of the bowl 112; and since the blocks 150 of each row 156 are spaced apart, each channel 160 is not continuous but is defined by a series of radially spaced, successively higher steps 162–a, 162–b and 162–c each of which constitutes a part of the corresponding bowl rims 143–a, 143–b and 143–c, respectively. The hereinbefore mentioned rim 129 is similarly spaced from the rim 143–c and is somewhat higher than the same, with the result that the upper edge of the rim 129 constitutes an additional, highest step 166 in each radial row of steps 162–a, 162–b and 162–c.

Thus it may be seen that the several rims 143 key the lemons to the bowl and thus revolve the lemons about the center of bowl rotation at constant angular velocity. Additional, the rims 143 and 129 constitute a series of baffles that operate to interrupt outward motion of lemons in response to centrifugal force and thus maintain control over the rate at which the lemons progress outwardly of the bowl 112 to regions thereof moving at greater linear velocity.

Means are provided in operative association with each steps 162–a, 162–b, 162–c and 166 of each radial channel 160 for lifting single lemons periodically to permit the same to advance over the respective rim 143 or 129, as the case might be, and thus to progress radially outward along the channels 160. In this manner, the lemons are caused to gradually attain maximum linear velocity in a series of graduated increments. For this purpose, a plurality of vertically reciprocable blocks 176 (FIGS. 2, 4, 5 and 6) are associated with each radial row 156 of fixed blocks 150. The blocks 176 are disposed in radial alignment with the fixed blocks 150 of the associated row 156 and are arranged alternately with the same, i.e., a reciprocable block 176 is disposed immediately in front of each fixed block 150 and in front of the portion of the outer rim 129 that constitutes the outermost fixed member of the row 156, as best shown in FIGS. 5 and 6. The reciprocable blocks 176 of each row are pivotally connected by transverse pins 178 to spaced parallel arms 180 that constitute outwardly and upwardly inclined extensions of a lever 182. One such lever 182 is provided in radial alignment with the space between each two adjacent ribs 128. The arms 180 of each lever 182 incline upward similarly to the upwardly inclined outer ends 144 of the ribs 128, and they are free to move between the same as the levers 182 partake of rocking movement about their respective pivot pins 184 (FIGS. 2–5). Each pivot pin 184 extends between a pair of spaced brackets 186 rigid with the associated lever 182 and through a block 187 rigid with and extending downward from the under surface of the bowl bottom 114. A cam follower roller 188 is rotatably mounted on the inner end of each lever 182 by means of a pin 190 disposed radially with respect to the shaft 121. The levers 182 extend radially in a circular pattern concentric with the shaft 121, and the rollers 188 are disposed in a circle which likewise is concentric with relation to the shaft 121.

The several cam follower rollers 188 are engaged within a slot 192 in a cylindrical cam 194 that is mounted in position concentrically encircling the shaft 121. The slot 192 divides the cam 194 into two spaced parts rigidly interconnected by a plurality of C-shaped spreader plates 196. The general plane of the slot 192 is inclined so that during each complete revolution of the centrifuge bowl 112 each cam follower roller 188 experiences a complete cycle of movement from an upper position to a lower position and return, causing the associated lever 182 to rock in such a manner as to first raise all of the blocks 176 pivoted to its outer end and to return them to their lower positions.

Preferably two cap screws 198 (FIGS. 5 and 6) are screwed into the outer or back face of each movable block 176 in position for their heads to bear frictionally against the front face of the fixed block 150 immediately therebehind, or against the inner face of the outer rim 129, as the case might be. The innermost movable blocks 176 project upward between the peripheral edge of the bowl bottom 114 and the innermost fixed blocks (FIGS. 5 and 6) to positions above the plane of bowl bottom 114. The front face 200 of each innermost movable block 176 is concave (best shown in FIG. 5) so that as lemons urged outwardly of the bowl 112 by centrifugal force reach the first rim 143–a, the concave inner faces 200 of the innermost movable blocks center lemons singly in alignment with the radial channels 160.

The upper edges 202 of the movable blocks 176 are shaped similarly to the upper edges 158 of the fixed blocks 150, i.e., they incline radially outward and upward and are transversely concave, thus presenting arcuate depressions each of which is of such size that when a block 176 is in a lowered position, a single lemon, but not more than one, can move into the depression of the lowered block, in position to be elevated by the block when the block subsequently rises. Preferably all but the innermost reciprocable blocks 176 are provided on their upper edges 202 with rubber pads 202′ similar in form, arrangement, and function to the hereinbefore mentioned pads 161′ carried by the fixed blocks 150. The fixed and movable blocks 150 and 176, respectively, are so proportioned that when the elevator blocks 176 are in their lowest positions, the upper edge 202 of the innermost elevator block is substantially in alignment with, and consequently, is in position to receive a lemon from the upper surface of the cushion 125 (FIG. 6), and the upper edge 202 of each of the other elevator blocks 176 is substantially in alignment with, and consequently is in position to receive a lemon from the upper edge 158 of the fixed block 150 immediately in front of the elevator block, as shown in full lines in FIG. 6. Therefore, when the elevator blocks 176 subsequently rise, each raises a single lemon.

The cam 194 and the levers 182 are designed to make the reciprocating stroke of the elevator blocks 176 of such length that when the elevator blocks 176 reach their upper positions, their upper edges 202 will be at such height that the lemons raised by all but the outermost elevator block 176 will be moved by centrifugal force onto the next succeeding fixed step 162–a, 162–b, or 162–c, as shown in broken lines in FIG. 6. The lemon raised by the outermost elevator block 176 will be moved by centrifugal force over the highest step 166 which is presented by the outermost rim 129, and into one of the hereinbefore mentioned receivers 58, one of which is provided in radial alignment with each radial channel 160 just outside the outer rim 129. Thus it may be seen that the outward movement of the lemons by centrifugal action is interrupted by the innermost blocks 176, which likewise align lemons singly with the several radial channels. Thereafter, each lemon is advanced radially outward along a channel 160 in a succession of intermittent movements, one of which occurs as the bowl 112 experiences each successive 180° of rotation.

Describing the progress of a single lemon through the rim section 56 of the bowl 54, the first such movement places the lemon on the upper edge 202 of the innermost elevator block 176 in the position indicated at L–1, FIG. 6, where outward movement of the lemon is temporarily interrupted by the first fixed block 150. During the subsequent rotation of the centrifuge bowl 112 through a half turn, the first elevator block 176 raises the lemon high enough for it to resume outward movement, rolling onto the first and lowest fixed step 162–a, into the position L–2, where outward movement is again temporarily interrupted by the second elevator block 176 which at the time is in its raised position. When the bowl 112 completes its next 180° of rotation, the said second elevator block 176 will be in its lowest position, thus permitting resumption of outward movement of the lemon into the position L–3. In this manner the lemon is advanced through one step during each half turn of the centrifuge bowl to positions at successively greater radial distances from the center of bowl-rotation, until the lemon reaches the position L–n wherein it engages the outer rim 129, but with its center of gravity slightly higher than the upper edge of the rim 129. Therefore, as the lemon continues to be subjected to centrifugal force, it rolls over and past the rim 129 and finally attains the position L in one of the receivers 58.

Being keyed to the bowl 112 for rotation therewith at constant angular velocity throughout the period that the lemon traverses the rim section 56 of the centrifuge bowl 112, the lemon experiences a series of successive linear accelerations, until finally the lemon attains the peripheral speed of the receptacle 54. Each velocity increment is so slight that the accompanying acceleration is relatively gentle, and therefore of such a nature that it occurs without injury to the lemon.

It will be understood that the movements of a single lemon thus described are likewise experienced simultaneously by other lemons in the same radial channel 160, since one lemon is accepted by the innermost elevator block 176 and passed on into the associated channel 160 during each full turn of the bowl 112. Therefore, a single file procession of intermittently advancing and accelerating lemons moves radially outward in each of the several channels 160, each of which discharges one lemon into a receiver 58 for each full rotation of the bowl 112. Thus, a number of lemons corresponding to the number of radial channels 160 are disposed singly in the receivers 58 during each revolution of the bowl. The bowl 112 is rotated so rapidly that this number of lemons are delivered singly into the receivers 58 many times per minute, thus accomplishing alignment of a great number of lemons per minute into single file procession so that they can be presented singly to, and explored singly by, the inspecting device 60. Furthermore, since the bowl 112 is of quite large size in order to accommodate the large number of radial channels 160, the peripheral speed of the bowl is quite high with the result that the single file procession of lemons carried by the receivers 58 advances at a high linear speed. Thus, a high output capacity of the machine 50 is attained.

*The Receivers 58*

The receivers 58 are arranged in an annular pattern encircling the outer rim 129 of the centrifuge bowl 112. They are supported from the bowl 112 by means of a mounting band 212 (FIGS. 6 and 7) secured to the outer face of the rim 129 adjacent the upper edge thereof. Since the several receivers 58 are of identical construction and are all mounted in a similar manner, the following description of a single receiver 58 and its mounting means will suffice. Each receiver 58 is pivotally mounted between two spaced, parallel mounting plates 214 that are rigid with and extend radially outward from the band 212. A pair of pivot pins 216 are rigidly mounted in axial alignment with each other on upwardly projecting extensions 218 of the plates 214. The receiver 58 is formed from a piece of wire or rod bent to U-shaped configuration to present two spaced, parallel legs 220 interconnected at their upper ends by a transversely extending portion 222 that is bowed downward to permit a lemon to roll off the outer end of the legs without interference. Both legs 220 are bent at points substantially midway of their length, and at their bends 224 axially aligned tubular bearings 226 are rigidly secured to the legs 220. In order to mount the receiver on its mounting plates 214, the legs 220 are flexed to move their bends 224 closer together, permitting the receiver to be inserted between the inwardly projecting pins 216 to align the bearings 226 with the pins 216, whereupon the legs 220 are permitted to spring back to their normal, parallel positions, sliding the bearings 226 onto the pins 216. A spreader bolt 228 is then tightened to secure the legs 220 in their parallel arrangement and thus insure retention of the receiver upon the pins 216, which thus support the receiver for pivotal movement about an axis perpendicular to the vertical plane that extends radially of the centrifuge bowl 112 and longitudinally bisects the associated radial channel 160 (see FIG. 5). The spreader bolt 228 extends between braces 230 each of which strengthens the receiver by rigidly interconnecting the two parts of one of the legs 220 extending in opposite directions from the bend 224.

When the receiver 58 is in lemon-retaining position the upper portions 232 of the legs 220 are disposed within a plane that inclines upward and outward from the upper edge of the bowl's outer rim 129. A pair of fingers 234 rigid with the mounting plates 214 at the upper edges of their etxensions 218, lie within this same plane, each substantially in alignment with the upper part 232 of one of the legs 220, so that the fingers are adapted to receive a lemon after the same has rolled across the upper edge of the rim 129, and to guide the lemon upward onto the upper parts 232 of the legs 220 as the lemon is impelled outward by centrifugal force, it being understood that the centrifuge bowl 112 is in constant rotation. Upon being thus guided onto the upper parts 232 of the legs 220, the lemon continues to move upward along the same until its further movement radially of the bowl is interrupted by its engagement with the under surface of a stop 236 rigid with the bowl rim 129 and thus defining the top of the receiver 58. Here the lemon is retained by the combined action of centrifugal force and upward pressure exerted thereagainst by the upper parts 232 of the legs 220, which thus constitute the bottom and outer side of the receiver 58 within which the lemon is retained by centrifugal force until the bowl rotates far enough to carry the lemon to the proper point in the circular path of the receivers 58 where lemons of its particular color classification are discharged.

The stop 236 is a U-shaped rod or wire disposed in a horizontal plane and above the position occupied by the upper parts 232 of the legs 220 when the receiver is in lemon-retaining position. The several stops 236 are rigidly secured to the under surfaces of two support rings 238 that are concentric with the axis of bowl rotation and are mounted in a common horizontal plane by a plurality of rods 240 (FIGS. 2, 4 and 5) rigid with and extending upward from the upward edge of the bowl rim 129.

Continuing with the description of a single receiver 58, it should be noted that the receiver is provided with one of the hereinbefore mentioned tripping devices 66, which includes a solenoid 242 mounted between the mounting plates 214 by a suitable bracket 244. The solenoid 242 is arranged with the axis of its coil 246 disposed horizontally and extending radially with relation to the bowl 112 between the lower parts 247 of the legs 220. The solenoid armature 248 is in the form of an arm pivoted for rocking movement about a horizontal axis lying in a plane perpendicular to the axis of the coil 246 and operates a lever 250 below the coil 246 and approximately parallel to the axis of the same. The armature 248 and lever 250 are rigid with each other, and when the coil 246 is energized, the armature-lever assembly is rotated clockwise (FIG. 6), causing the lever 250 to depress the inner end of a latch dog 252 that is pivoted intermediately of its ends on a pin 254 mounted between ears 256 extending downward from the bracket 244. When the inner end of the latch dog 252 is thus depressed its outer end is raised far enough to clear a latch plate 258 carried by the lower extremities of the legs.

Therefore, the effect of energization of the solenoid 242 is to release the latch mechanism or tripping device 66. This permits the lower parts 247 of the legs 220 to swing inward in response to the outward pressure of a lemon against the upper parts 232 of the legs induced by the centrifugal force to which the lemon trapped within the receiver 58 is subjected until the lemon is released from the receiver as a consequence of the above described release of the tripping mechanism 66. At the instant that such release occurs, the upper parts 232 of the legs 220 yield to the outward pressure exerted thereagainst by the lemon, permitting the lemon to depart from the circular path in which it has been carried by the receiver, and due to its own inertia, to follow a trajectory extending tangentially therefrom.

The latch plate 258 is relatively large so that it possesses sufficient mass to respond to centrifugal force as soon as the lemon is discharged from the receiver 58, so as to return the legs 220 to their receiver-closing positions. Before the next successive lemon passes over the rim 126 into the receiver 58, the solenoid 242 is de-energized permitting the latch dog 252 to return by gravity to its latch plate engaging position and thus to prepare the receiver 58 for subsequent reception of another lemon.

Inspecting and Color Segregation

While the lemons are lodged within the receivers 58, and, therefore, while they are being advanced in single file at a high rate of speed and in rapid succession, the lemons are presented to the inspecting device 60 (FIG. 1) thus enabling the inspecting device to explore the lemons individually. Inasmuch as the details of construction and the principle of operation of the inspecting device 60 do not constitute a part of the present invention, no description thereof need be here presented. An inspecting device that meets the requirements of the present invention is disclosed in application Serial Number 322,267, filed November 24, 1952 by John B. Powers, now Patent No. 2,933,613, dated April 19, 1960. It will suffice for the purposes of the present disclosure to explain that the inspecting device 60 reacts to the color of a lemon by light reflected from the surface thereof and emits an electrical impulse distinctively associated with the color of the lemon. The most common color types by which lemons are commercially classified are (1) dark green, (2) light green (3) silver, and (4) yellow, these names being employed to identify lemons of the respective color classifications in the order of their degree of maturity. The inspecting device 60 distinguishes between colors of these classifications and, in response to its exploration of each lemon whose color is within one of the first three of the above-enumerated classifications, emits an electrical impulse peculiar to the color type to which the explored lemon belongs. In the present case the distinction between the three different impulses emitted by the inspecting device 60 is that they are transmitted to different electrical circuits each of which operates to feed the impulse into the memory device 64.

The details of the memory device 64 do not fall within the purview of the present invention and need not be set forth herein. As far as requirements of the present disclosure are concerned, it need only be explained that when any of the input circuits of the memory device is energized as above mentioned, the memory device transmits the electrical impulse to the tripping solenoid 242 associated with the receiver 58 that contains the lemon which caused the inspecting device 60 to energize the input circuit, but only after the receiver 58 has advanced through a certain angular distance beyond the inspecting device. Such angular distance is different for each of the three input circuits, the arrangement being such that the tripping solenoids 242 of receivers 58 containing dark green lemons are energized at the point A (FIG. 1) in their circular orbit, the solenoids 242 of receivers 58 containing light green lemons are energized at the point B which is at a greater angular distance from the inspecting device 60, and the solenoids of receivers containing lemons of "silver" color are energized at point C which is at a still greater angular distance from the inspecting device 60. The memory device 64 likewise includes a circuit for energizing the solenoids of all receivers 58 at point D, which is beyond the point C, and consequently, at the greatest distance of all from the scanner. Therefore, any lemon remaining entrapped within a receiver 58 after passing point C will be discharged at point D.

Thus it may be seen that dark green lemons are discharged from the receivers 58 at point A, light green lemons are discharged at point B, silver lemons at point C, and yellow lemons at point D.

Decelerating Receptors 62

Since lemons handled by the machine 50 are released from the centrifuge bowl 112 at the four angularly spaced points A, B, C, and D in the circular path of the receivers 58, four receptors 62–*a*, 62–*b*, 62–*c* and 62–*d* for the released lemons are provided. These receptors are arranged with their major axes tangent to the circular path of the receivers 58 at the points A, B, C, and D, respectively. Hence, each receptor 62 is adapted to receive all lemons released from receivers 58 at one of the four release points. The lemons that each receptor 62 receives enter the same at high speed, flying freely through the air in a nearly horizontal trajectory at a velocity corresponding to the peripheral speed of the receivers 58, and it is the function of each receptor 62 to gradually absorb the kinetic energy of the rapidly moving lemons that enter the receptor and thus decelerate the lemons so gently that they can be delivered into boxes without injury to the fruit.

The present disclosure does not require description of more than one of the receptors 62 and its associated box-filling station S, since all four are of identical construction. A typical receptor 62 is illustrated in FIGS. 8–11. It comprises an elongate rectangular box-like housing 500 including side walls 502 and a rear wall 504, while the front or inlet end 506 of the housing is open for entry of lemons thereinto. The bottom, likewise, of the housing 500 is open, and rests upon a horizontal conveyor frame 508 carried by legs 510.

A deflector plate 512 (FIGS. 9 and 10) is mounted just inside of the open front end 506 of the housing 500 adjacent the bottom of the same, in an inwardly and upwardly sloping position intersecting the trajectory of lemons entering the housing 500. The upper surface of the deflector plate 512 is covered by a thick pad 514 of resilient material such as sponge rubber, so that the lemons entering the housing will bounce therefrom without injury to the fruit. This serves to absorb some of the kinetic energy of the lemons and thus to initiate deceleration of the lemons. Due to the characteristic non-spherical shapes of the lemons, they bounce off the pad in various directions and thus are caused to drop into different portions of a decelerating labyrinth 68 that is arranged within the housing 500 above the entire open bottom of the housing 500 except that portion of the open bottom which is below the deflector plate 512. Some of the lemons drop directly into the labyrinth 68 after bouncing off the pad 514, whereas some bounce against pads 518 covering the inner faces of the side walls 502 and others bounce against a thick curtain 520 of cushioning material suspended by its upper edge from a transversely extending mounting cleat 521 at the top and adjacent the rear wall 504 of the housing 500.

The decelerating labyrinth 68 comprises a large number of substantially parallel flexible members 522 extending transversely of the housing 500 within the lower portion of the same. Each member 522 comprises a suitable length of rope or cord 524 (FIG. 11) secured at its ends to directly opposite portions of the side walls 502, as by knots 526 (FIGS. 8 and 9) tied in the cord outside the walls 502. A plurality of spools 528 are mounted on each cord 524, each spool being of resiliently yieldable material and comprising a central hub 530 and a plurality of fins 532 radiating therefrom. The members 522 are spaced apart by a distance somewhat less than the diameter of a lemon of the smallest marketable size, so that regardless of the direction of travel of a lemon as it approaches the labyrinth 68 the lemon cannot pass between two adjacent members 522 without impinging against at least one of them. The spools 528 are rotatable on the cords 524, so that although the fins 532 of the spools 528 intercept the lemons and tend to decelerate them, the fins yield under the impact and thus moderate the rate of deceleration. Another detail that aids in avoiding too abrupt deceleration of the lemons is the free suspension of the cords 524 resulting from their being left somewhat loose so that each is festooned in a shallow catenary (see FIG. 9) permitting the entire transverse member 522, as well as the fins 532 of the spools thereof, to yield when engaged by a flying or dropping lemon.

Thus it may be seen that although the lemons entering the housing 500 are flying freely through the air at considerable velocity, their kinetic energy is dispersed as they impinge against the pads 514 and 518, against the curtain 520, and against the yieldable transverse members 522. Consequently, when the lemons leave the housing 500 after filtering downward through the labyrinth 68 their velocity is only that which is induced by gravity as the lemons fall but a short distance between the transverse members 522 of the labyrinth. This permits the lemons to drop gently onto the upper run 534 of an endless belt 536 (FIGS. 9 and 10) of the associated conveyor 70 to which reference has been made previously, and which is mounted within the conveyor frame 508 in position extending horizontally beneath the open bottom of the housing 500.

The upper run 534 of the belt 536 is slidably supported by a plate 540 extending horizontally between the side members 541 of the conveyor frame 508, to which the plate 540 is secured by flanges 542 (FIG. 10) integral with the plate 540 and welded or otherwise fastened to the side members 541. A plurality of flexible flaps 544 are draped over rods 545 extending between the side walls 502 of the housing 500 beneath the labyrinth 68. The lower edges of the flaps frictionally engage the conveyor belt 536. The flaps 544 prevent lemons deposited upon the belt 536 from bouncing ahead at a speed in excess of the linear speed of the conveyor. Additionally, the flaps 544 effect more even distribution of the lemons over the surface of the belt 536 as the lemons accumulated on the belt are advanced thereby toward the discharge end of the conveyor 70.

The conveyor belt 536 is trained around pulleys 546 and 548 (FIG. 10) at the entrance and discharge ends, respectively, of the conveyor 70, and around idler pulleys 550 and 552. The idler pulley 552 is adjustable to impose the desired degree of tension upon the belt 536 and is adapted by suitable means (not shown) to be releasably locked in selected position of adjustment. The conveyor belt 536 is driven by a motor 553 (FIGS. 1 and 8) carried by an adjustable base 554 that is mounted on the housing 555 of a box filling station S into which the discharge end of the conveyor 70 projects. The shaft 556 of the motor 553 carries a sprocket 558 drivingly connected by a chain 559 to a sprocket 560 on the shaft 562 of the pulley 548 at the discharge end of the conveyor 70.

As shown in FIG. 9, an apron 564 inclines into the open front end 506 of the housing 500 to a position above the receiving end of the conveyor 70. This apron extends below the normal trajectory of lemons flying into the housing end and is confined between extensions 566 of the side walls 502, thus being adapted to catch any lemons whose trajectory from the receivers 58 is too low for them to reach the deflector plate 512, and to guide them directly onto the conveyor belt 536.

*Box Filling Stations S*

The box filling station S (FIGS. 1, 8, 10, and 12–23) into which the conveyor 70 discharges lemons received from the receptor 62, is typical of the four stations S, one of which is associated with each receptor 62–a, 62–b, 62–c and 62–d. Its hereinbefore mentioned housing 555 (FIGS. 13–16) is supported on upright posts 570 which, in turn, are supported on the frame 572 of the box filler conveyors 76–a and 76–b, which will be described later herein. The discharge end of the associated conveyor 70 projects into the housing 555 to a position approximately midway between the front and rear walls 576 and 578 thereof. Lemons are discharged from the conveyor 70 across an inclined apron 580 (FIGS. 12, 13, and 14) having thereon a pad 581 of cushioning material and extending between and rigidly secured to the side walls 582 (FIG. 14) and 583 (FIGS. 13 and 15) of the housing 555.

A plate 584 (FIGS. 13 and 14) for deflecting lemons in either of two directions is mounted within the housing 555 below the apron 580. The lemon deflector 584, which includes a cushioning pad 585, is rigidly secured by a plurality of suitably apertured flanges 586 upon a shaft 588 that is rotatably mounted by bearings 590 (one shown, FIG. 14) on the side walls 582 and 583 of the housing 555. Both ends of the shaft 588 project through the side walls 582 and 583. The end of the shaft 588 that projects through the wall 583 (FIG. 15) carries a manually operable handle 592, a stop lever 594, and a cam disc 596, all rigid with the shaft 588. The handle 592 can be employed to manually move the shaft 588 optionally to either of the two positions indicated respectively by the full line showing and by the broken line showing of the handle, lever, and cam plate in FIG. 15. Two spaced stop screws 598–a and 598–b are arranged in the path of movement of the stop lever 594 to limit the extent of rocking movement of the shaft 588, each stop screw 598–a, 598–b being adjustably threaded through a lug 600 projecting from the wall 583 and provided with a lock nut 602. The cam disc 596 is formed with two notches 604–a and 604–b in its perimeter so related to each other and to the stop lever 594 that when the lever engages the stop screw 598–a, the notch 604–a is aligned with and receives the actuating element 606 of a normally closed switch Sw15–a mounted on the side wall and thus permits closing of the switch Sw15–a while an oppositely mounted normally closed switch Sw15–b is opened. Upon movement of the shaft 588 to its other extreme position, as determined by engagement of the lever 594 with the other stop screw 598–b, the condition of the two switches is reversed, i.e., the switch Sw15–a is opened and the switch Sw15–b is closed.

The end of the shaft that projects through the wall 582 (FIG. 14) is connected with means for automatically actuating the shaft 588 to move the lemon deflector 584 to either of its alternative positions. Two opposed solenoids Sn1–a and Sn1–b are mounted on the outer face of the side wall 582 in position for their respective armatures 620 to be connected by links 622 and a single pivot pin 624 to an actuating arm 626 disposed between the solenoids. The lever 626 is pivotally mounted at its upper end on a stud 628 rigid with the wall 582, vertically above and parallel to the protruding end of the deflector plate shaft 588. The projecting end of the shaft 588 carries a crank arm 630 that is rigid with the shaft and a lever 632 that is freely pivoted on the shaft. A spring 634 is under tension between pins 633 and 638 rigid with the crank arm 630 and the lever 632, respectively, so that rotary motion of the lever 632 is transmitted to the crank arm 630 and shaft 588 until turning of the shaft is terminated by one of the stop screws 598–a or 598–b, as the case might be, after which rotary motion of the lever 632 can continue briefly, as shown in FIG. 14. A pin 640 rigid with the lever 632 is engaged within a notch 642 in the lower end of the actuating arm 626, and a spring 644 under tension between the stud 628 and the pin 640 retains the latter seated within the notch 642. It is evident, therefore, that the result of de-energization of the solenoid Sn1–b and energization of the solenoid Sn1–a is to swing the actuating arm 626 and the crank arm 630 to the left, as viewed in FIG. 14, thus tipping the lemon deflector 584 to its position illustrated in FIGS. 13, 14, and 15, wherein it is adapted to deflect lemons received from the conveyor 70 into a hopper 646–a supported from the housing 555 and adapted to guide lemons delivered thereto into a box disposed thereunder in a box loading position P–a (FIGS. 13 and 16) adjacent the front wall 576 of the housing 555. Upon de-energization of the solenoid Sn1–a and energization of the opposite solenoid Sn1–b, the actuating arm 626, crank arm 630, and shaft 588 are moved to their alternative extreme positions, tipping the deflector 584 to a position wherein it is adapted to deflect the lemons received from the conveyor 70 into another hopper 646–b supported from the housing 555 and adapted to guide lemons delivered thereto into a box disposed thereunder in a box loading position P–b (FIGS. 13 and 16) adjacent the rear wall 578 of the housing 555. A suspended curtain 650 (FIG. 13) of cushioning material and suitably cushioned baffle boards 652, 654, and 656 aid in confining the stream of lemons passing through the housing 555 to the desired path.

Empty Box Distributing Conveyor 74

The hereinbefore mentioned box distributing conveyor 74 (FIGS. 1 and 12) makes a supply of empty boxes constantly available to each of the box filling stations S. The conveyor 74 includes a straight section 670 adjacent each filling station S and a curved section 672 interposed between each two straight sections 670. The distributing conveyor 74 likewise includes a curved section 674 leading to the straight section associated with the first filling station S in the succession of stations S served by the distributing conveyor 74, a curved section 676 leading from the straight section 670 of the last of the succession of stations S, and a return section 678 interconnecting the two curved sections 674 and 676. Thus, the distributing conveyor 74 is endless and is adapted to circulate a supply of empty boxes from which a box can be intercepted and withdrawn into any one of the filling stations S whenever a filled box is discharged therefrom. During operation of the lemon sorting machine 50 of the invention, the distributing conveyor 74 should be kept filled with empty boxes, substantially to capacity, so that empty boxes pass each filling station S in rapid succession. A feeder conveyor 680 obliquely intersecting the return section 678 facilitates feeding an empty box onto the distributing conveyor 74 whenever a sufficiently large space occurs in the succession of boxes circulating on the endless conveyor 74, so as to promptly replace an empty box withdrawn from the distributing conveyor 74 into any one of the filling stations S.

As best shown in FIGS. 1 and 12, a section of the distributing conveyor 74 comprises two spaced, parallel frame members 682 and a plurality of transversely extending rollers 684 journalled in the frame members 682. Driving motors 686 are provided at spaced intervals throughout the length of the distributing conveyor 74, and suitable means (not shown) are provided to connect the rollers 684 to the motors 686 to be driven thereby and thus to effect advance of the succession of boxes on the conveyor 74.

Intercepting Conveyors 690

An intercepting conveyor 690 (FIGS. 1, 12, and 16) is associated with each box filling station S, all the intercepting conveyors 690 being of the same construction and operating in the same manner. Each comprises two side frame members 692 (FIGS. 12 and 16) somewhat longer than a box of the type intended to be employed in the present sorting machine 50. The members 692 are interconnected by members 694 that maintain the side members 692 in parallel relation, spaced apart by a distance approximately three times the width of the distributing conveyor 74. Each intercepting conveyor 690 is mounted between the associated straight portion 670 of the distributing conveyor 74 and the curved portion 672 or 674, as the case might be, from which boxes advance to the straight portion 670. Therefore, the empty boxes must pass over the intercepting conveyors 690 as they follow their generally circular orbit on the distributing conveyor 74.

Again restricting the description to a single box filling station S, the inner side frame member 692 of its intercepting conveyor 690 is aligned with the inner side frame members 682 of the two adjacent sections of the distributing conveyor 74, and consequently the outer end of the intercepting conveyor 690 projects outward from the distributing conveyor far enough to align boxes captured from the distributing conveyor with either of the two associated filler conveyors 76–a and 76–b which extend perpendicularly from the intercepting conveyor 690 to positions beneath the two associated hoppers 646–a and 646–b, respectively. Rollers 700 are journalled in the two side frame members 692 at spacing substantially corresponding to that of the rollers 684 of the distributing conveyor 74. The rollers 700 are parallel to, and are driven in the same direction as the adjacent distributing conveyor rollers 684.

The driving means for the rollers 700 comprises a belt 702 (FIGS. 12 and 16) trained around two horizontally aligned, parallel pulleys 704 (FIG. 12) and 706 (FIG. 16) that are journalled in a subframe 708 rigidly supported by the transverse frame members 694 below the rollers 700. The belt 702 is also trained around an idler roller 710 adjustably journalled in the subframe 708 so that the belt 700 can be properly tensioned. The pulleys 704 and 706 are so positioned that a plane tangent to the upper sides of both is somewhat higher than the plane tangent to the lower sides of the conveyor rollers 700; and an idler roller 712 is interposed between each two adjacent conveyor rollers 700 in position parallel thereto and at such height that the upper sides of the idler rollers are somewhat higher than the lower sides of the conveyor rollers, as indicated in FIG. 16. Hence, the upper run of the belt 702 is pressed upward by the idler rollers 712 and firmly into engagement with a considerable area of each conveyor roller 700, so that the belt 702 is adapted to drive all of the conveyor rollers. The pulley 704 (FIG. 12) is driven from one of the sections of the distributing conveyor 74 by a gear 714 fixed to a projecting end of the shaft 716 of one of the distributing conveyor rollers 684, and enmeshed with a gear 718 fixed to a projecting end of the shaft 720 of the pulley 704.

Two parallel endless conveyor chains 722 are arranged with their upper runs slidably supported on rigid tracks 723 (FIG. 16) between adjacent conveyor rollers 700 and below the level of the upper sides of the rollers 700, but so slightly below that flights 724 interconnecting the two chains 722 are adapted to engage a side wall of a box resting on the inner part of the intercepting conveyor 690 and propel the box toward the outer end thereof. During such movement of a box, it slides along the rollers 700, axially thereof. The chains 722 are trained around spaced idler sprockets 726 (FIG. 16) carried by a shaft 728 that is journalled in a frame extension 730 on the inner side frame member 692. At the outer end of the intercepting conveyor 690, the chains 722 are trained around spaced driving sprockets 732 fixed to a shaft 734 journaled in a frame extension 736. A chain 738 (FIG. 12) and sprockets 740 (one shown) establish driving connection between the shaft 734 and a motor 742 likewise mounted on the frame extension 736. The chains 722 encompass the subframe 708 (FIG. 16) a rigid contoured track 746 being provided for each chain 722 on the lower edge of which the lower run of the chain is guided as it advances obliquely downward from its driving sprocket 732, horizontally inward below the subframe 708, and obliquely upward toward its idler sprocket 726.

Box Filler Conveyors 76–a and 76–b

As best shown in FIG. 1, two box filler conveyors 76–a and 76–b, respectively, are associated with each intercepting conveyor 690, extending perpendicularly therefrom and parallel to the associated straight section 670 of the distributing conveyor 74 to a position beneath the associated filling station housing 555. As best shown in FIGS. 12, 13 and 16, the two filler conveyors 76–a and 76–b associated with each box filling station S are carried by one of the hereinbefore mentioned box filler conveyor frames 572. The two conveyors 76–a and 76–b are separated by a stationary divider rail 750 rigid with the frame 572. The two conveyors 76–a and 76–b are identical in construction and operation, as are likewise the elevator mechanisms 80–a and 80–b associated with the conveyors 76–a and 76–b, respectively. Accordingly, but one filler conveyor and its associated elevator mechanism will here be described in detail.

The filler conveyor 76–a, illustrated in FIGS. 12, 13, 16, and 18–23 comprises two parallel endless chains 752, each trained around a driving sprocket 754 and an idler sprocket 756 (FIG. 12) at the discharge and receiving ends, respectively, of the conveyor 76–a. The shafts 758 and 760 on which the sprockets 754 and 756, respectively, are mounted are suitably journalled in the frame 572 and extend past the divider rail 750 and completely across the frame 572 to carry the corresponding sprockets 754 and 756 of the companion filler conveyor 76–b. The upper run 762 of each chain 752 is slidably supported on and is guided by a horizontal track 764 (FIGS. 13 and 19–23) rigid with the frame 572, while the lower run 766 of each chain 752 is trained around idler sprockets 768 (FIGS. 12 and 16) and 770 (FIGS. 13 and 16) rotatably mounted on side members 772 of the frame 572.

During operation of the sorting machine 50, the filler conveyor chains 752 are constantly driven by a motor 774 drivingly connected by a sprocket 775 (FIG. 13) and a chain 776 (FIGS. 12 and 18) to a sprocket 778 fixed to an end of the shaft 758 that projects through and beyond the frame member 780 on which the motor 774 is mounted.

Both filler conveyors 76–a and 76–b lead to and are adapted to discharge filled boxes onto a discharge conveyor 782 (FIG. 1) which is driven from the shaft 758 by a chain 784 (FIGS. 1 and 18) at a speed somewhat higher than that of the filler conveyors 76–a and 76–b.

*Elevator Mechanism 80–a*

As best shown in FIGS. 13 and 19–23, the elevator mechanism 80–a associated with the filler conveyor 76–a comprises a hydraulic cylinder 790 rigidly mounted in an erect position by a flange 792 fixed to the cylinder 790 and secured by bolts 794 to a transversely extending channel member 796 of the filler conveyor frame 572. The cylinder 790 is centered below the hopper 646–a and the box filling position P–a (FIG. 13), while the cylinder 790 of the companion elevator 80–b is centered below the hopper 646–b and the box filling position P–b. A ram or plunger 798 (FIGS. 19–25) is reciprocably mounted in the cylinder 790 and is adapted to be raised and lowered in response to variation in the pressure of fluid supplied to the cylinder through a conduit 800 connected to the cylinder 790 and communicating with the bore thereof adjacent its lower end.

A horizontal plate 802 (FIGS. 13 and 18–23) is affixed to the upper end of the plunger 798, and two laterally spaced, vertical side plates 804 are secured to the horizontal plate 802 by means of bolts 806 engaged with flanges 808 at the ends of the horizontal plate 802. Each side plate 804 carries vertical guide rails 810 (FIGS. 13, 16 and 18) that slide within guide channels 812 fixed to the frame 572. The overall horizontal distance between the outer vertical edges of the guide rails 810 is somewhat less than the distance between the two chains 752 of the associated filler conveyor 76–a so that the rails 810 and a scale platform 814 that is mounted between the upper ends of the side plates 804 can pass freely between the conveyor chains 752 as the elevator mechanism 80–a is operated.

*Weighing Scales 816*

The weighing scales 816 (FIGS. 13 and 18–23) of which the platform 814 is a part are mounted within an open-topped box-like frame 818 including ends 820 and sides 822 secured by welding 824 to the upper ends of the side plates 804. A skirt 826 depends from each end of the frame 818 to shield the scales mechanism. One of the skirts 826 carries a vertical runner 827 (FIGS. 18–23) in such position that except when the elevator is in its fully lowered position, the runner is adapted to engage a box urged forward on the filler conveyor 76–a toward the elevator 80–a, and to hold the box back therefrom in such a manner as to avoid its interference with operation of the elevator while the elevator is raising or lowering a preceding box.

The mechanism of the scales 816 includes an upper yoke lever 828 and a lower yoke lever 830 upon which the scale platform 814 is supported. The legs 832 and 833 of the yoke levers 828 and 830, respectively, are connected by pivot pins 834 and 835 to the lower ends of hangers 836 and 837 which are freely suspended from pivot pins 838 and 839, respectively, each of which extends between a side 822 of the frame 818 and a lug 840 projecting inward from an end 820 of the frame 818.

Two brackets 842 and 843 of inverted U-shaped configuration are secured to the under surface of the platform 814 adjacent the ends thereof in position for the lower ends of the legs 844 and 845, respectively, of the brackets to rest upon knife edges 846 and 847 secured to and projecting laterally outward from the legs 832 and 833 of the yoke levers 828 and 830. Stabilizing links 848 and 849 loosely connect the brackets 842 and 843, respectively, to the ends 820 of the frame 818 to prevent horizontal shifting of the platform 814 relative to the frame without restricting the vertical movement that the platform experiences during operation of the scales 816. The stem 850 of the lower yoke lever 830 is supported from the stem 852 of the upper yoke lever 828 by a double link 854 (FIGS. 18 and 19) that is suspended from a double knife edge 862 projecting laterally from both sides of the stem 852 of the upper yoke lever 828 into holes (not shown) adjacent the upper end of the link 854, while a double knife edge 866 carried by the stem 850 of the lower yoke lever 830 engages within holes (not shown) adjacent the lower end of the link 854.

The stem 852 of the upper yoke lever 828 projects beyond the link 854 and carries a double knife edge 870 that seats within aligned holes (not shown) in the legs of a clevis 872 that is secured to the upper end of push rod 874. A clevis 876 secured to the lower end of the push rod 874 is connected to one end of a scale beam 878 by a double knife edge 880 engaged within holes (not shown) in the legs of the lower clevis 876. The scale beam 878 is balanced on a double knife edge 881 which projects from both sides of the beam 878 intermediate the ends thereof and is engaged within aligned holes (not shown) in the legs of a U-shaped bracket 882 rigid with and upstanding from a transversely extending mounting bar 883 affixed at its ends to the two scale frame side plates 804.

From the above described arrangement of yoke levers, knife edge fulcrums, and scale beam, it is evident that pressure exerted downward against the platform 814, such as that resulting from the weight of a box and its contents supported on the platform, tends to pivot the upper yoke lever 828 counterclockwise (FIG. 19) about its pivot pin 834, and to pivot the lower yoke lever 830 clockwise about its pivot pin 835, thus urging downward the inner ends of their stems 852 and 850, respectively. The force with which the lower yoke lever 830 is urged to pivot is transmitted to the stem 852 of the upper yoke lever 828 so that the total force imposed upon both yoke levers is transmitted through the push rod 874 to the scale beam 878 in such a manner that the scale beam is urged to pivot counterclockwise (FIG. 19) with a force proportional to the weight imposed upon the scale platform 814. Such movement of the scale beam 878 is resisted by a coil spring 884 that is under tension between an anchoring screw 886 on the end of the scale beam that moves upward in response to downward movement of the platform 814 and an eye-bolt 888 whose shank extends vertically through a clearance hole (not shown) in a transverse brace 890 affixed at its ends to the two scale frame supporting side plates 804. Nuts 892 threaded onto the shank of the eye-bolt 888 and engaging opposite faces of the brace 890 are adjustable to regulate the tension of the spring 884 and thus to determine the angular distance through which the scale beam 878 pivots in response to imposition of a weight of predetermined magnitude upon the scale platform 814. A counterweight 894 is carried by a rod 896 threaded therethrough and rotatably mounted in brackets 898 rigid with the scale beam and spaced apart longitudinally of the same. The rod 896 can be turned by means of a handle 900 on one end thereof to effect adjustment of the counterweight 894 to that position in which the scales 816 are accurately balanced.

The counterweight 894 includes a plate 902 that engages the horizontal plate 802 on the upper end of the plunger 798 to prevent downward movement of the scale beam 878 in a clockwise direction (FIG. 19) beyond the position which it occupies when the scale platform 814 is in its uppermost position. Upward movement of the scale beam 878 is limited by a stop 904 fixedly secured to and projecting from a transverse member 906 of the scales frame 818.

*Elevator Control Apparatus 920*

A complete elevator control apparatus 920 (FIGS. 1, 24, and 25) is provided for each box filler station S. Each control apparatus 920 is provided with a cabinet 922 individual thereto, the several cabinets 922 being arranged in position conveniently adjacent their respectively associated filler conveyor frames 572, as illustrated in FIG. 1. But one control apparatus 920 will here be described as they are all the same.

A control apparatus 920 includes a hydraulic pump 924 constantly driven during operation of the sorting machine 50, by a motor 926. Both the motor 926 and the pump 924 are mounted on the top of the associated cabinet 922 (FIG. 1) whereas the other elements of the apparatus 920 are mounted within the cabinet 922. Such other elements include two solenoid valves 928–a and 928–b, respectively, and two solenoid valves 930–a and 930–b, respectively. Each solenoid valve 928–a, 928–b, 930–a and 930–b includes a cylinder 932, a plunger 934 reciprocable therein, a spring 936 releasably retaining the plunger 934 in its "normal" position, and a solenoid 938 which, when energized, moves the plunger 934 to an alternative position. The cylinder 932 of each solenoid valve 928–a and 928–b has a single inlet port 940 and two outlet ports 942 and 944, respectively, whereas the cylinder 932 of each valve 930–a and 930–b has a single inlet port 946 and a single outlet port 948. Normally each of the valves 928–a and 928–b maintains communication between its inlet port 940 and its outlet port 942, as illustrated in FIG. 24, whereas upon energization of the associated solenoid 938, the valve's outlet port 942 is closed and communication is established between the valve's inlet and outlet ports 940 and 944, respectively, as illustrated by the showing of the valve 928–b in FIG. 25. The pump 924 draws fluid from a reservoir 952 and pumps the fluid under pressure to the inlet port 940 of the valve 928–a. Therefore, when both valves 928–a and 928–b are in their normal condition, as illustrated in FIG. 24, fluid is circulated by the pump 924 through the valve 928–a, conduit 950, valve 928–b and through a return conduit 954 back to the reservoir 952 without having an effect upon either associated elevator mechanism 80–a or 80–b.

The outlet port 944 of the valve 928–a is connected by a conduit 956 to the hereinbefore mentioned conduit 800 which leads to the bottom of the cylinder 790 of the elevator mechanism 80–a. Therefore, in order to raise a box supported upon the scales 816 of the elevator mechanism 80–a, it is necessary only to energize the solenoid 938 of the valve 928—a, the effect of which is to close the outlet port 942 and open the outlet port 944 of the valve 928–a, causing fluid to flow through the conduits 956 and 800 to the cylinder 790 of the elevator mechanism 80–a. Similarly, when it is desired to raise a box supported upon the scales 816 of the elevator mechanism 80–b, the valve 928–a should be left in its normal position and the solenoid 938 of the valve 928–b energized, closing the outlet port 942 of the latter and permitting fluid circulated by the pump 924 through the valve 928–a and conduit 950 to flow from the valve 928–b through its outlet port 944 and thence by a conduit 958 to the conduit 800 associated with the elevator mechanism 80–b as shown in FIG. 25. Consequently, the valves 928–a and 928–b will hereinafter be termed the "up valves" for the elevator mechanisms 80–a and 80–b, respectively, and their solenoids 938 will be referred to as the "up solenoids" S*n*2–a and S*n*2–b, respectively.

The normal condition of each of the valves 930–a and 930–b is with its plunger 934 closing both the inlet port 946 and the outlet port 948 thereof, as illustrated in FIGS. 24 and 25, whereas when the solenoid 938 of either valve 930–a or 930–b is energized, its plunger 934 is moved to a position wherein communication is established between the valve's inlet and outlet ports 946 and 948, respectively. The conduit 800 associated with the cylinder 790 of the elevator mechanism 80–a is connected to the inlet port 946 of the valve 930–a and the conduit 800 connected to the cylinder 790 of the elevator mechanism 80–b communicates with the inlet port 946 of the valve 930–b. Therefore, when it is desired to lower a box on the scales 816 of the elevator mechanism 80–a the solenoid 938 of the valve 930–a should be energized, thus establishing communication between the ports 946 and 948 of the valve 930–a so that fluid can be expelled from the cylinder 790 of the elevator mechanism 80–a through the valve 930–a whence it flows by a return conduit 960 back to the reservoir 952. Silimarly, in order to lower a box supported on the scales 816 of the elevator mechanism 80–b the solenoid 938 of the valve 930–b should be energized. This establishes communication between the inlet and outlet ports 946 and 948 of the valve 930–b and permits fluid to be expelled from the cylinder 790 of the elevator mechanism 80–b and through the valve 930–b and the return conduit 960 back to the reservoir 952. Therefore, the valves 930–a and 930–b will hereinafter be termed the "down valves" for the elevators 80–a and 80–b, respectively, and their solenoids 938 will be referred to as the "down solenoids" S*n*3–a and S*n*3–b, respectively.

It will be understood that the plunger 798 of either elevator mechanism will be retained in an elevated position by the hydrostatic pressure of fluid within its cylinder 790, so long as the associated down valve 930–a or 930–b, as the case might be, remains in normal position, and that partial lowering of a box supported on either elevator can be attained by opening the associated down valve for a limited time.

*Automatic Box Maneuvering Controls*

The electrical controls associated with the filler conveyor 76–a and the elevator mechanism 80–a of one of the box filling stations S will be described, each element thereof being identified by a reference character with the suffix "a" added. It is to be understood that a counterpart of each such element is likewise provided in association with the filler conveyor 76–b and the elevator mechanism 80–b, and that such counterparts will be identified by respectively corresponding reference characters with the suffix "b" added. It is further to be understood that a similar arrangement of controls is provided for each box filling station S.

A box stop switch Sw1–a associated with the filler conveyor 76–a, is so constructed and arranged that it is closed by a box as the box arrives over the platform 814 of the elevator 80–a. The switch Sw1–a includes a switch housing 1002 (FIG. 19) mounted in fixed position upon a transverse frame member 1004 between the two driving sprockets 754 of the filler conveyor 76–a. The housing 1002 encloses normally separated switch contacts (not shown) adapted to be closed when a plunger 1006 projecting through the bottom of the housing 1002 is pressed upward. The actuating mechanism for the switch Sw1–a comprises a rod 1008 extending slidably through a tubular spring guide 1010 which extends slidably through the transverse frame member 1004. A finger 1012 projects radially from the rod 1008 to a position in which it is adapted to engage and press the plunger 1006 upward to switch-closing position when the rod 1008 is moved axially upward. A clevis 1014 affixed to the upper end of the rod 1008 is pivotally connected to the outer end of a crank arm 1016 rigid with and extending radially from a sleeve 1018 rotatably mounted on a shaft 1020 that is rigid with and extends transversely of the filler conveyor frame 572 below the level of the upper runs 762 of the chains 752 of the associated filler conveyor 76–a. Two parallel fingers 1022, each having a roller 1024 rotatably mounted at its outer end, project radially from the sleeve 1018 adjacent the ends of the same and adjacent the associated conveyor chains 752, as best shown in FIGS. 18 and 19. A coil sping 1026 (FIG. 19), loosely encircling the spring guide 1010, is under compression between the transverse frame member 1004 and a flange 1030 on the upper end of the spring guide 1010.

Upper and lower lock nuts 1032 and 1034, respectively, limit the extent of axial movement of the rod 1008 relative to the spring guide 1010, and a snap ring 1036 seated in a circumferential groove in the spring guide 1010 adjacent the lower end thereof limits upward movement of the spring guide by engagement with the under surface of the frame member 1004. The spring guide 1010 and rod 1008 normally are supported by the spring 1026 with the fingers 1022 extending obliquely upward past the plane of the runs 762 of the chains 752 of the conveyor 76–a and away from the discharge end of the conveyor so that when a box advancing on the conveyor 76–a engages the rollers 1024 it lifts the rollers and pivots the fingers 1022 counterclockwise as viewed in FIG. 19. This turns the sleeve 1018 in such a manner as to pull the rod 1008 upward until the lower lock nuts engage the lower end of the spring guide 1010 whereupon continued upward movement of the rod lifts the spring guide 1010 until the snap ring 1026 engages the frame member 1004. Such engagement prevents further upward movement of the rod 1008 and thus arrests counterclockwise movement of the fingers 1022 to immobilize the box on the filler conveyor 76–a while the chains 752 slide under the box.

Before the rod 1008 attains its uppermost position the finger 1012 engages the switch plunger 1006 and presses the same to switch closing position, thereby effecting actuation of the associated elevator mechanism 80–a as will be more fully explained presently. This causes the elevator 80–a to rise, lifting the box off the conveyor chains 752 and thereby releasing the rollers 1024 and fingers 1022, permitting the same to return by gravity to their normal position as illustrated in FIG. 19. Therefore, upon subsequent return of the box after having been filled with lemons, as will likewise be explained presently, the rollers 1024 lie in the path of descending box so that as the box comes to rest upon the conveyor chains 752, the rollers 1024 and fingers 1022 are forced down to positions below the level of the upper runs 762 where they will not interfere with resumption of forward movement of the box by the conveyor chains. When the fingers 1022 and rollers 1024 are thus depressed below their box intercepting position, the spring 1026 is compressed so that upon passage of the box out of engagement with the rollers 1024, the spring 1026 immediately returns the arms 1022 and rollers 1024 to their effective positions as illustrated in FIG. 19, thus placing them in readiness to intercept the next box to approach on the filler conveyor 76–a.

A snubbing leaf spring 1038 is secured at its lower end to the frame member 1004 so that its upper end bears frictionally against the sleeve 1018. While the snubbing spring 1038 permits the sleeve 1018 to turn in response to the urge of the spring 1026, it prevents movement of the arms 1022 and rollers 1024 by their own inertia beyond the position in which they are adapted to be supported by the spring 1026 when the latter is extended.

Thus, the snubbing spring 1038 assures placement of the fingers 1022 and rollers 1024 in proper positions to intercept the next successive box, and it prevents accidental closure of the switch Sw1–a due to excessively rapid return of the switch actuating mechanism to its "ready" position when a box passes out of engagement with the rollers 1024.

Each elevator platform 814 is provided with two transversely aligned prongs 1040 (FIGS. 18 and 19) of resilient material. These prongs 1040 are affixed to the under surface of the platform 814 by rivets 1042 and extend upward through slots 1044 to dispose their pointed ends 1046 above the platform and pointing in the direction of movement of a box approaching the rollers 1024. Accordingly, the prongs are adapted to engage the bottom of a box on the platform 814 and prevent the box from bouncing backward when it engages the rollers 1024.

Two vertically extending switch actuating cams 1050–a and 1052–a, respectively, (FIG. 12) are secured to a side plate 804 of the elevator mechanism 80–a. As hereinbefore explained, the plate 804 is carried by and moves with the plunger 798 of the elevator. Switches Sw2–a and Sw3–a are mounted on the filler conveyor frame 572 in cooperative association with the cam 1050–a. The switch Sw2–a is normally open but is so positioned that it is engaged and held closed by the cam 1050–a at all times except when the cam is in its highest position. The switch Sw2–a functions as, and will hereinafter be called the "high limit switch" for the elevator 80–a. The switch Sw3–a is normally closed, but is so arranged that it is engaged and held open at all times when the cam is at or below the uppermost of four partially lowered positions. This uppermost partially lowered position is spaced below the highest position of the cam 1050–a by a distance approximately equal to one quarter of the vertical dimension of a box of the type intended to be handled by the apparatus.

Three normally closed switches Sw4–a, Sw5–a, and Sw6–a, respectively, are mounted on the conveyor frame 572 in position to be successively engaged and opened by the cam 1052–a as the elevator mechanism 80–a moves downward to progressively lower positions. These positions are spaced below the highest position of the elevator 80–a by distances approximately equal, respectively, to one-half, three-quarters, and the full height of one of the boxes. Consequently, the switches Sw3–a, Sw4–a, Sw5–a, and Sw6–a will hereinafter be referred to as elevator position switches.

The scale beam 878 carries a wiper switch contact 1054–a (FIGS. 19–23) projecting from the outer end thereof and thus adapted to move in an arcuate path through a distance proportional to the travel of the associated scale platform 814 relative to the scale frame 818. An arcuate series of electrical contacts Sw7–a, Sw8–a, Sw9–a, and Sw10–a are mounted on a block of insulating material 1056 rigid with the transverse member 906 of the associated scale frame 818. These contacts are arranged in position to be engaged by the movable contact 1054–a when a box supported on the associated scale platform 814 contains quantities of lemons approximately equal to one-fourth, one-half, three-quarters, and full capacity, respectively, of the box.

A plurality of normally open box positioning switches Sw11 (FIGS. 12, 16, and 17) are associated with the distributing conveyor 74, one switch Sw11 being mounted below the receiving end of each intercepting conveyor 690. The actuator for a switch Sw11 comprises a trip lever 1058 carried by an arm 1060 (FIG. 17) that is pivoted to a bracket 1062 secured to the lower portion of one of the chain guiding tracks 723 of the associated intercepting conveyor. A return spring 1064 under tension between the pivoted arm 1060 and the chain track 723 urges the trip lever 1058 to a raised position wherein the trip lever extends between two of the rollers 700 of the intercepting conveyor 690 and projects the curved upper end of the trip lever 1058 far enough above the level of the rollers to be engaged and depressed by every box advancing on the portions of the rollers 700 that constitute a continuation of the distributing conveyor 74. The parts are so arranged that such engagement of the lever 1058 by a box occurs just before the box reaches the position in which it is aligned with the associated intercepting conveyor 690, as is made evident by observation of FIG. 1.

A relieved portion or circumferential groove 1066 is provided in the roller 700 immediately behind the trip lever 1058, to accommodate the curved upper end thereof when the lever is depressed by a box, and thus permit the box to pass freely over the depressed lever. When the lever 1058 is thus depressed, the pivoted arm 1060 engages the plunger 1068 of the switch $Sw11$ in a manner to close the switch.

A box stop in the form of a horizontal bar 1070 is carried by a pair of U-shaped arms 1072 rigid with a sleeve 1074 that is rotatable upon a shaft 1076 rigid with a frame member 692 of the intercepting conveyor. Likewise secured to the sleeve and extending radially downward therefrom is a crank arm 1078 the lower end of which is pivoted to a short sleeve 1080. The sleeve 1080 is slidable on a rod 1082 connected at one end to the armature 1084 of a solenoid $Sn4$. A coil spring 1086 is under compression between the sleeve 1080 and a nut 1088 at the other end of the rod 1082. A jamb nut 1090 threaded on the rod 1082 limits movement of the sleeve 1080 on the rod 1082 toward the armature 1084. Thus, when the solenoid $Sn4$ is energized, the lever 1078, sleeve 1074 and arms 1072 are rotated clockwise as viewed in FIG. 17 about the shaft 1076. This thrusts the box stop bar 1070 upward between the last roller 700 of the conveyor 690 and the first roller 684 of the distributing conveyor section 670 immediately therebeyond in the direction of box travel on the distributing conveyor 74. Accordingly, when the solenoid $Sn4$ is energized, the box stop bar 1070 is adapted to intercept and immobilize the next successive box to reach the bar 1070 after engaging the associated trip lever 1058.

An abutment screw 1092 is carried by a web 1094 interconnecting the two arms 1072. When the box stop bar 1070 is raised, the screw 1092 is adapted to engage an extension 1096 of the trip lever arm 1060 and pivot the trip lever 1058 downward out of engagement with a box on the rollers 700, and thus prevent the trip lever 1058 from interfering with lateral movement of the box along the intercepting conveyor 690.

Two normally closed box positioning switches $Sw12-a$ (FIGS. 12 and 16) and $Sw12-b$ (FIG. 16) are associated with each intercepting conveyor 690. The switch $Sw12-a$ operates to stop the conveyor 690 when a box thereon becomes aligned with the filler conveyor 76-a. Therefore, the switch $Sw12-a$ is mounted in such a position that its operating lever 1102 is engaged and moved by a flight 724 of the intercepting conveyor when a box propelled by the next following flight 724 is aligned with the filler conveyor 76-a. The switch $Sw12-a$ is carried by a bracket 1104 adjustably mounted on the frame extension 736, and the lever 1102 is pivotally mounted on the bracket 1104. The parts are so arranged that when a flight 724 moves the actuator, the latter pushes the actuating element 1106 of the switch $Sw12-a$ inward and opens the switch.

The switch $Sw12-b$ (FIG. 12) is mounted adjacent the end of the intercepting conveyor 690 remote from the distributing conveyor 74, with the operating lever 1108 of the switch $Sw12-b$ in position to be engaged by a box on the conveyor just before the box moves into alignment with the filler conveyor 76-b. The parts are so arranged that as the box attains such alignment, the lever 1108 moves the actuating element 1110 of the switch $Sw12-b$ to switch closing position.

It is important to note that while the operating lever 1108 for the switch $Sw12-b$ is in position to be engaged and moved by a box on the conveyor 690, the lever 1108 is at such height above the conveyor 690 that the flights 724 can pass freely under the lever 1108 without making contact therewith. Thus, the switch $Sw12-b$ is actuated only when a box arrives in alignment with the filler conveyor 76-b.

*Operation of the Box-Handling Apparatus*

A supply of empty boxes should be placed on the distributing conveyor 74 before the machine is started, and during operation of the machine empty boxes should be supplied to the distributing conveyor with sufficient frequency to promptly replace empty boxes withdrawn therefrom. Elevators 80-a and 80-b should be in their down positions, and before starting the machine two empty boxes should be placed on each filler conveyor 76-a, 76-b one over the associated elevator platform 814 and the other rearwardly thereof.

In placing the boxes upon the filler conveyors over the elevator platforms 814 the boxes should be slid forward until they engage the rollers 1024 (FIGS. 12, 13, 16, 18 and 19) and rotate the arms 1022 until they reach the limit of their upward movement and thus prevent further forward movement of the boxes. In this manner the box stop switches $Sw1-a$ and $Sw1-b$ of all the box filling stations S, will be closed. All high limit switches $Sw2-a$ and $Sw2-b$ (FIG. 12) will be held closed by the cams 1052-a and 1052-b, respectively, since all elevators 80-a and 80-b are down. Therefore, at each station S, circuit A (FIG. 26), which includes a box stop switch $Sw1-a$ and a high limit switch $Sw2-a$ connected in series, will be completed and placed in readiness to energize a relay $R-a$ when power is supplied to the circuits. A circuit B at each station S will similarly be prepared to energize a relay $R-b$ since this circuit includes a switch $Sw1-b$ and a switch $Sw2-b$ connected in series.

The trunk lines T-1 and T-2 (FIG. 26), should then be connected to a source of electrical energy, and manually controlled normally open switches $Sw-13$ and $Sw-14$ should be closed. These switches are included in circuits C and D which also include the resistance starters $St-1$ and $St-2$ of the several feeder conveyor motors 774 (FIGS. 1 and 13) and of the several pump motors 926 (FIGS. 1, 24 and 25), respectively. Thus, all motors 774 and 926 are placed in operation. Conventional holding circuits HC-c and HC-d are provided to keep the motors 774 and 926 in operation unless and until manually operable safety stop switches $SSw-c$ and $SSw-d$ are opened. Hence the pumps 924 of the hydraulic systems of all box filling stations S will remain in operation, as will also the filler conveyors 76-a and 76-b of all stations S, in the absence of any emergency requiring that the operation of the box distributing apparatus be interrupted.

Operation of the box handling apparatus associated with but one of the box filling stations S will be described, since they all operate in the same manner.

Circuits A and B having been completed, relays $R-a$ and $R-b$ will be energized when power is supplied to the trunk lines T-1 and T-2. This closes contacts $a-1$ and $b-1$ thus establishing holding circuits HC-a and HC-b, shunted around box stop switches $Sw1-a$ and $Sw1-b$, respectively, to maintain circuits A and B after manually closed switches $Sw1-a$ and $Sw1-b$ are released.

Energization of relays $R-a$ and $R-b$ also closes contacts $a-2$ and $b-2$ to complete circuits E and F, respectively, thereby energizing both up solenoids $Sn2-a$ and $Sn2-b$ of the hydraulic control circuit (FIGS. 24 and 25). This closes the port 942 of the valve 928-a and opens the port 944 thereof causing hydraulic fluid supplied under pressure from the pump 924 to flow through the up valve 928-a and the conduit 956 to the cylinder 790 of the elevator 80-a (FIGS. 13 and 18-25). Thus the elevator 80-a is actuated to raise the box that was placed over its platform 814. As the box rises out of engagement with the rollers 1024 of the box stop switch $Sw1-a$, this switch opens, but the relay $R-a$ continues to be energized through the holding circuit HC-a.

Arrival of the elevator 80–a at its uppermost position places the box thereon in initial loading position P–a (FIGS. 13, 16 and 20) wherein the hopper 646–a extends into the box so far that the bottom edge of the hopper is spaced but slightly from the bottom of the box, as illustrated in FIG. 20. As the elevator 80–a attains its highest position, the cam 1050–a (FIG. 12) passes out of engagement with the actuating element of high limit switch Sw2–a. This permits the switch Sw2–a to open, de-energizing relay R–a, and thus opening contacts a–1 and contacts a–2. The effect of opening contacts a–1 is to open the holding circuit HC–a and thus to place circuit A in readiness for the next succeeding cycle of operation. The effect of opening contacts a–2 is to de-energize solenoid Sn2–a (FIGS. 24 and 25) permitting the associated plunger 934 to return to its initial position. This closes the outlet port 944 of the valve Sn2–a, and thereby maintains hydrostatic pressure within the elevator 80–b to hold the box thereon in elevated position. Return of the plunger 934 of valve 928–a likewise opens the outlet port 942 thereof, permitting the pump 924 to force fluid through the conduit 950 and through the valve 928–b whose port 944 is open as the result of energization of the solenoid Sn2–b. Therefore, fluid is supplied to the cylinder 790 of elevator 80–b, forcing its plunger to its highest position. In this manner the elevator 80–b lifts an empty box into initial loading position P–b under the hopper 646–b corresponding to the above-described initial loading position of a box under the hopper 646–a. The condition of the parts of the hydraulic system as the elevator 80–b attains its highest position is illustrated in FIG. 25.

Upon arrival of the elevator 80–b at its highest position, the cam 1050–b thereof (FIG. 12) passes out of engagement with the actuating element of high limit switch Sw2–b, opening circuit B (FIG. 26), de-energizing relay R–b, and thus opening contacts b–1 and b–2. Opening the contacts b–1 opens the holding circuit HC–b and thus places the circuit B in readiness for the next succeeding cycle of operation. Opening the contacts b–2 de-energizes the solenoid Sn2–b (FIGS. 24 and 25) permitting its plunger 934 to close its outlet port 944 and thereby maintain the elevator 80–b in its highest position. This likewise opens the outlet port 942 of valve 928–b, whereupon idling flow of fluid from the pump 924 back to the reservoir 952 without performance of any work is resumed.

Assuming the lemon deflector plate 584 to be in the position illustrated in FIG. 13 at the time of arrival of boxes in the loading positions P–a and P–b, lemons discharged from the associated receptor conveyor 70 will be guided into the box in position P–a. As lemons accumulate within this box, the increasing weight thereof gradually depresses the associated scales platform 814, causing the scale beam 878 to gradually rise from the position which it occupies when the box is empty, which position is illustrated in FIG. 20. When the box becomes approximately one quarter full, the wiper contact 1054–a engages the switch contact Sw7–a, thus completing a first elevator lowering circuit G–a (FIG. 26) through first position switch Sw3–a (FIGS. 12 and 26) to energize down solenoid Sn3–a (FIGS. 24, 25, and 26). This actuates the down valve 930–a (FIGS. 24 and 25) to release fluid from the cylinder 790 of the elevator 80–a, permitting its plunger 798 and the box supported thereby to move downward. When the elevator 80–a has dropped through a distance approximately equal to one-fourth the height of the box, the cam 1050–a (FIG. 12) that moves with the elevator 80–a engages and opens the first position switch Sw3–a, thus opening the circuit G–a. This deenergizes the solenoid Sn3–a, and permits the down valve 930–a to close, interrupting downward motion of the elevator 80–a and thereby immobilizing the same in a first partially lowered position.

As the supply of lemons to the box on the elevator 80–a continues, the scale beam 878 continues to swing upward, moving the wiper contact 1054–a beyond the contact Sw7–a. When the box becomes approximately half filled, the contact 1054–a engages contact Sw8–a, as illustrated in FIG. 21. The contact Sw8–a is included in a second elevator lowering circuit H–a which includes the normally closed second position switch Sw4–a (FIGS. 12 and 26) and the down solenoid Sn3–a. Therefore, when the box becomes about half filled, downward motion of the box is resumed, and continues until it is lowered through a total distance approximately equal to one-half the height of the box, as illustrated in FIG. 22. At this time the cam 1052–a opens the second position switch Sw4–a, again de-energizing the solenoid Sn3–a and closing the down valve 930–a to again interrupt downward movement of the elevator 80–a and the box thereon. The elevator 80–a is thus immobilized in a second partially lowered position, where it remains until the box thereon is filled to approximately three-fourths of its capacity at which time the third lowering circuit I–a is completed by engagement of the wiper contact 1054–a on the scale beam 878 with the third lowering contact Sw9–a. Thus the down solenoid Sn3–a is energized again to effect resumption of lowering of the box until it has dropped through a total distance equal to approximately three-fourths its vertical dimension. At this time, the third position switch Sw5–a is opened by the cam 1052–a, deenergizing the down solenoid Sn3–a and immobilizing the elevator 80–a in a third partially lowered position. The box remains in this third partially lowered position until it is filled to the desired capacity.

In this manner, the distance through which the lemons are permitted to fall into the box is minimized during all stages of the filling operation as a precaution against bruising the lemons by falling through too great a distance while the box is empty or only partly filled.

When the box is filled to the desired capacity or extent, the scale beam 878 moves the wiper contact 1054–a into engagement with the uppermost, or total weight contact Sw10–a. This contact Sw10–a is included in a circuit J–a which also includes a relay R–c so that when the desired quantity of lemons has accumulated in the box, the relay R–c is energized, opening its contacts c–1 and closing its contacts c–2, c–3, and c–4.

Contacts c–1 are included in a circuit J–b that corresponds to the circuit J–a, but is associated with the elevator 80–b. Therefore energization of the relay R–c assures completion of all the operations in connection with the elevator 80–a and filler conveyor 76–a that are about to be described and that are initiated as the result of energization of the relay R–c, before the corresponding operations of elevator 80–b and filler conveyor 76–b are initiated.

Relay contacts C–2 are connected in a circuit K–a in series with the hereinbefore-mentioned normally closed switch Sw15–a (FIG. 15) that is held open by the cam disc 596 at all times except when the deflector plate 584 is in position to guide lemons into a box on the elevator 80–b. Circuit K–a also includes the down solenoid Sn3–a, but energization of this solenoid is delayed momentarily after closing of contacts C–2 because when closing of contacts C–2 ocurs, switch Sw15–a is held open by the disc 596.

Relay contacts C–3 are included in a circuit L–a which also includes the solenoid Sn1–a (FIG. 14) herein before described as being operatively connected to the deflector plate 584. Accordingly, when the contacts C–3 are closed, solenoid Sn1–a is energized, causing the actuating arms 626 to swing to the right as viewed in FIG. 14, carrying with it the lever 632. As the latter approaches its alternate extreme position, it imposes tension upon the spring 634 which increases until the crank arm 630 is caused to follow the arm 626, turning the shaft 588 and thereby tipping the deflector plate 584 away from the position in which it deflects lemons into the hopper 646–a in which it is indicated in FIG. 14, and into position to deflect lemons into the hopper 646–b. This likewise turns the cam disc 596 (FIG. 15) so as to align the notch 604–a thereof with the actuator 606 of switch Sw15–a, allowing the latter to close and thereby complete the circuit K–a. Thus, completion of circuit K–a occurs as a consequence of shifting the deflector plate 584 out of position to guide lemons into the box on elevator 80–a, but with sufficient time lag thereafter to prevent closing of switch Sw15–a until arrival within the box on elevator 80–a, of any lemons that may have dropped off the plate 584 after the switch Sw10–a is closed.

The effect of closing switch Sw15–a is to energize down solenoid Sn3–a for a fourth time, opening the down valve 930–a (FIGS. 24 and 25) and thereby permitting resumption of downward movement of the elevator 80–a, to lower the filled box onto the chains 752 of the filler conveyor 76–a. As the scales of the elevator 80–a are thus relieved of the weight of the filled box, the scale beam 878 returns its wiper contact 1054–a to its initial position (FIG. 19) wherein it is in readiness to start the next cycle of operation. As the elevator 80–a approaches its lowest position, its cam 1052–a opens the switch Sw6–a (FIG. 12), but this does not de-energize the relay R–c, since normally closed relay contacts d–1 are connected into the circuit J–a in parallel with the switch Sw6–a, and are connected to the trunk line T–1 through the relay contacts C–2 which remain closed so that energization of relay R–c continues.

As hereinabove explained, when the filled box is lowered onto the chains 752, it rides on top of the rollers 1024, and thus depresses them and the arms 1022 so as to avoid actuating the switch Sw1–a at this time. This also prevents the arms 1022 and rollers 1024 from interfering with advance of the filled box by the constantly moving chains 752. Therefore, as soon as the filled box is received by the chains 752, they move the filled box out of the filling station S and onto the associated discharge conveyor 782.

As the filled box is advanced from over the elevator 80–a, the empty box on the conveyor 76–a takes its place. This succeeding box has been restrained by the runner 827 (FIGS. 18 and 19) until the scales platform 814 of the elevator 80–a drops below the level of the conveyor chains 752, at which time the runner 827 releases the empty box, permitting the chains 752 to advance it closely after the filled box that is being withdrawn from over the elevator 80–a. However, since the discharge conveyor 782 operates at a higher speed than the filler conveyor 76–a, the filled box is drawn away from the entering empty box, thus leaving sufficient gap between the two boxes for the rollers 1024 to rise in front of the entering box, so that the latter will, when it attains proper position above the scales platform of elevator 80–a, actuate the switch Sw1–a as hereinabove described. However, the next succeeding cycle of operation does not begin at this time, as the down solenoid Sn3–a is still energized, thus preventing pressure from building up within the cylinder 790 of the elevator 80–a, which is thus prevented temporarily from raising the newly arrived empty box.

Every box advancing on the distributing conveyor 74 engages the trip lever 1058 (FIG. 16) and closes the switch Sw11. This switch is included in a circuit M–a which also includes the normally open solenoid contacts C–4, which, therefore, prevent completion of the circuit M–a except when the relay R–c is energized as a consequence of the box on elevator 80–a having been filled to capacity, as hereinabove explained. The effect of closing the solenoid contacts C–4, therefore, is to prepare the circuit M–a for energization when the next succeeding box on the distributing conveyor 74 engages and depresses the associated trip lever 1058. The circuit M–a also includes the box stop switches Sw12–a and Sw12–b, but as both of these switches are normally closed, when the circuit M–a is thus prepared and the trip lever 1058 is depressed, closing the switch Sw11, the circuit M–a is completed and relay R–d is energized. This opens normally closed contacts d–1 that are shunted around switch Sw6–a in circuit J–a and thus de-energizes relay R–c, which opens relay contacts C–2, de-energizing solenoid Sn3–a and thus actuating elevator 80–a to raise the empty box thereon into loading position P–a.

Normally open relay contacts d–2 are closed by relay R–d when the latter is energized, and since the contacts d–2 are shunted around relay contacts C–4 and switch Sw11, energization of relay R–d is continued after relay R–c is de-energized and after the box that caused energization of switch Sw11 moves away from the trip lever 1058.

Energization of relay R–d also closes relay contacts d–3 to complete circuits N and O, which include the box stop solenoid Sn–4 (FIGS. 17 and 26) and the resistance starter St–3 for the diverter conveyor motor 742 (FIG. 12), respectively. The effect of energizing solenoid Sn–4 is to raise the box stop bar 1070 (FIGS. 12 and 17) and thus immobilize the box that tripped the lever 1058, when the box is in alignment with the intercepting conveyor 690. The effect of energizing the starter St–3 is to place the intercepting conveyor 690 in operation. Therefore, within a very short time after a box trips the lever 1058 while the relay contacts C–4 are closed, a flight 724 of the intercepting conveyor 690 engages the box that has been stopped by the raised box stop bar 1070 and slides the box sideways along the rollers 700 of the intercepting conveyor 690.

The motors 686 that drive the distributing conveyor 74 and the rollers 700 of the intercepting conveyors are arranged to be energized only when a magnetic starter St–4 is energized. The starter St–4 is included in a circuit P that also includes normally open relay contacts g–1 which are held closed so long as the relay R–g is energized. The relay R–g is included in a circuit Q that also includes a plurality of sets of relay contacts d–4, one set for each of the several box filling stations S. All sets of relay contacts d–4 are normally closed, i.e., are closed except when their respective actuating relays R–d (one such relay R–d being associated with each box filling station S) are energized. Moreover, all sets of relay contacts d–4 are connected in series, with the result that when the relay R–d associated with any one of the box filling stations S is energized, the distributing conveyor motors 686 are de-energized, and the distributing conveyor 74 stops. Since the rollers 700 of the intercepting conveyor 690 are driven from the same motors 686, the rollers 700 also stop. Therefore, when a box is pushed along the rollers 700 by a flight 724 of an intercepting conveyor 690, the rollers 700 of the conveyor 690 are motionless, and the box is enabled to follow a straight line path.

Returning to the description of the operation of the box handling apparatus associated with one of the stations S, the box thus advancing on the intercepting conveyor 690 as a consequence of energization of relay R–d and closing relay contacts C–4 and d–2, continues to so advance until it is aligned with the filler conveyor 76–a (FIGS. 12, 13, and 16). At the instant that this alignment is attained, the flight 724 preceding the box engages the actuating element 1102 (FIG. 16) of box position switch Sw12–a and opens this switch. This de-energizes relay R–d which opens relay contacts d–3, de-energizing the box stop solenoid Sn4, and thus permits the box stop bar 1070 to drop to its retracted position below the level of the rollers 700. De-energization of relay R–d also permits the associated relay contacts d–4 to close, thereby causing the motors 686 to be energized and thus causing the distributing conveyor 74 to resume operation. Rollers 700 also are caused to rotate, and the box that has been aligned with the filler conveyor 76–a is thus advanced onto the chains 752 of the conveyor 76–a which carry the box forward until it engages the runner 827 of the elevator 80–a, which at this time is in an elevated position. Thus the empty box is placed in readiness to be received over the elevator 80–a when it next lowers a filled box onto the chains 752 of the conveyor 76–a and the filled box is removed from the elevator 80–a as hereinabove described.

It will be seen by reference to the wiring diagram of FIG. 26, that the apparatus for presenting empty boxes to the hopper 646–b on the elevator 80–b, for lowering the box as it is filled in a succession of lowering steps, for discharging the filled box from over the lowered elevator 80–b, and for replacing the discharged box with an empty box intercepted from the distributing conveyor 74, operates similarly to that described above in connection with the apparatus operative in conjunction with the elevator 80–a. Corresponding circuits are provided for operating the equipment associated with elevator 80–b, these circuits being identified by the same reference characters but with the suffix "b" substituted for the suffix "a."

Briefly summarized, the operation of the apparatus associated with elevator 80–b is as followers: As the box on elevator 80–b gradually fills, lowering circuits G–b, H–b, and I–b are successively closed and opened by cooperative actions of the lowering switches Sw7–b, Sw8–b, and Sw9–b and the position switches Sw3–b, Sw4–b, and Sw5–b causing the box to assume successive partially lowered positions. When the box is filled, relay R–e in circuit J–b is energized by engagement of wiper contact 1054–b with switch Sw10–b. This opens relay contacts e–1 in circuit J–a and thus prevents simultaneous operation of both elevators. Energization of relay R–e closes relay contacts e–2 and e–3, the latter being in circuit L–b to energize deflector plate solenoid Sn1–b and return the deflector plate 584 to the position wherein it guides lemons into the hopper 646–a. When this occurs switch Sw15–b is closed, causing the elevator 80–b to drop the filled box thereon onto the conveyor 76–b. Energization of relay R–e also closes relay contacts e–4, energizing relay R–f in circuit M–b and thereby closing holding contacts f–2 in circuit M–b, opening one of a plurality of sets of relay contacts f–4 in circuit Q to stop the conveyor 74, and closing relay contacts f–3 in circuit O to raise the box stop bar 1070 and to start the intercepting conveyor 690 the next succeeding time thereafter that the trip lever 1058 is depressed to close the box stop switch Sw11. This causes a box to be intercepted on the distributing conveyor 74 to be advanced on the intercepting conveyor 690 until the leading side of the box engages the operating lever 1108 (FIG. 12) and opens the position switch Sw12–b to stop the box in alignment with the filler conveyor 76–b, and to start the distributing conveyor 74 and the rollers 700 of the intercepting conveyor, to advance the empty box onto the chains 752 of the filler conveyor 76–b. In this manner the empty box is placed in readiness to advance onto the elevator 80–b when the elevator 80–b discharges its filled box onto the conveyor 76–b.

At any time while the machine is running, a box can be discharged from either elevator 80–a or 80–b without waiting for the box to be filled. For this purpose, normally closed, emergency push button switches E1–a and E1–b (FIG. 26) are provided in circuits A and B, respectively. Both switches E1–a and E1–b are manually operable independently of one another to open their respective circuit. The switches E1–a and E1–b are mechanically connected by means that are not illustrated, to normally open switches E2–a and E2–b, respectively, in such a manner that when either switch E1–a or E1–b is opened, its companion switch E2–a or E2–b is closed. The switches E2–a and E2–b are connected into circuits K–a and K–b in parallel with the relay contacts c–2 and e–2, respectively.

Since supplying fluid to the elevator 80–a is dependent upon closing of the relay contacts a–2, as hereinabove explained, which in turn requires energization of the relay R–a, opening the emergency switch E1–a prevents the elevator 80–a from rising. Since release of fluid pressure within the cylinder 790 of the elevator 80–a to effect lowering of a box on the elevator 80–a, is accomplished by completing circuit K–a, the effect of closing switch E2–a, which is shunted around the relay contacts C–2, is to cause the elevator 80–a to lower a box thereon, provided only that the deflector plate 584 (FIG. 12–15) is in position to direct lemons into the box on the elevator 80–b.

The cycle of raising an empty box on the elevator 80–b and filling the box can be interrupted at any time to effect immediate discharge of the box from the machine in a manner similar to that described above in connection with the elevator 80–a. Here again, however, if the operation of filling the box on the elevator 80–b has started before the cycle is interrupted, it is necessary for the operator to manually shift the plate 584 to deflect the lemons into the box on the other elevator 80–a, as well as to operate the emergency switch E1–b, to cause immediate discharge of the partly filled box. That the deflector plate 589 be in position to guide lemons into the box on the other elevator is a prerequisite to operation of the emergency box discharge feature of the apparatus, since the switch Sw15–a must be closed before the elevator 80–a can be made to perform its final lowering movement, and the switch Sw15–b must be closed before the elevator 80–b can attain its lowest position, as hereinabove explained. Thus a safety factor is introduced, preventing removal of a partly filled box from the apparatus while lemons are still being filled thereinto, and requiring only that when it is desired to remove a box being filled, the deflector plate 584 may be manually shifted to its alternative position by means of the handle 592 (FIG. 15).

*General Operation*

The lemon sorting machine is ready to be placed in operation when two empty boxes have been placed on each filler conveyor 76–a, 76–b (FIG. 1) of each box filling station S in the manner hereinabove explained, and when the distributing conveyor 74 has been provided with a number of empty boxes sufficient to fill the conveyor 74 approximately to its capacity. To accomplish this, the control switches (not shown) for the motors 100 and 134 should be closed to actuate the supply conveyor 52 and to cause the centrifuge bowl 112 of the feeding mechanism 53 to rotate. The trunk lines T–1 and T–2 (FIG. 26) should be connected to a source of current and the switches Sw–13 and Sw–14 in the circuits C and D should be closed to place the box handling apparatus in operation, as hereinabove explained. The control switches (not shown) for the electronic inspecting device 60 (FIG. 1) and the memory device 64 (FIGS. 2 and 3) should be closed, whereupon the sorting machine 50 will be in readiness to receive lemons to be sorted.

The lemons to be sorted may be delivered to the supply conveyor 52 (FIGS. 1, 2 and 3) in any convenient manner, such as by being fed thereto in a continuous stream by a conveyor that receives the lemons from a washing apparatus, or by being dumped onto the supply conveyor 52 from the field boxes in which the lemons are conveyed from the orchard. In any case, the lemons enter the bowl 112 by gently sliding and rolling from the conveyor 52, across the apron 110 and onto the pad 125 on the bottom of the bowl 112, which, through its frictional engagement with the lemons, gradually causes the same to revolve about the axis of rotation of the bowl. The lemons are delivered into the bowl in a region thereof sufficiently removed from its axis of rotation for each lemon, as it revolves about the bowl axis, to be subjected to centrifugal force with the result that the lemons move radially outward of the bowl 112 along a multiplicity of divergent paths. In this manner the lemons are dispersed and become more widely separated as they approach the peripheral region of the bowl. This facilitates the matter of permitting each radial channel 160 to receive but one lemon at a time.

If the innermost reciprocable block 176 (FIGS. 4, 5, and 6) defining the inner, or entrance end of a channel 160 is in lowered position at the time that a lemon reaches the block, the lemon seats within the hollow of the concave upper edge 202 of the block. This concavity is too small to accommodate more than one lemon at a time thus further reducing tendency for lemons to enter and advance through the channel 160 otherwise than in single file. If a block 176 of the innermost row of blocks is raised at the time that a lemon first reaches it, the lemon lodges momentarily within the hollow of the concave inner face 200 of the block and upon subsequent lowering of the block, seats within the hollow of the concave upper edge 202, in the same manner as though the block had been down when first encountered by the lemon.

The manner in which the blocks 176 are raised and lowered by the cooperating cam 194 (FIGS. 2, 3, and 4) and cam follower rollers 188, causing the blocks 176 to lift the lemons high enough to move outward over the next adjacent fixed blocks 150, and then to again interrupt outward motion of the lemons, is fully set forth hereinbefore. As the result of the repeatedly interrupted outward progress of a row of lemons in each radial channel, the lemons are advanced gradually and in a fully controlled manner to and past the outermost rim 129. Therefore, as each lemon approaches a receiver 58 (FIGS. 1–7), its linear velocity is increased in a series of relatively small increments, and therefore, in such a gentle manner that it attains a linear velocity corresponding to the peripheral speed of the receiver 58 so gently that injury to the lemons is avoided.

From the above it is apparent that each radial channel 160 conveys a single file of lemons from which one lemon enters the associated receiver 58 during each full turn of the rotating bowl 112. The cam 194 is arranged to cause the vertically reciprocable blocks to attain their uppermost positions and thus to deliver a lemon into each receiver 58 but a short interval before the receiver reaches the point in the bowl's rotation where the inspecting device 60 (FIG. 1) is mounted. Thus, the receivers 58 are adapted to present the lemons singly and in rapid succession to the inspecting device 60, enabling the latter to detect the color characteristics of each lemon individually. The electronic inspecting device 60 distinguishes between lemons of the four color types hereinbefore mentioned, and, through the memory device 64 (FIGS. 2, 3, and 4), causes each receiver 58 to discharge the lemon therefrom when the receiver 58 reaches a point in its circular orbit directly in front of the decelerating receptor 62 (FIGS. 1, 2, 8, 9, and 10) intended to receive all lemons of the color type to which belongs the lemon responsible for the reaction of the inspecting device causing discharge of the lemon. Therefore, the machine 50 operates to deliver all lemons of each of several color types into a particular receptor 62, as follows: receptor 62–a receives all dark green lemons, receptor 62–b receives all light green lemons, receptor 62–c receives all silver lemons, and receptor 62–d receives all yellow lemons.

As the lemons enter the receptors 62 they are in free flight and are moving in an approximately horizontal trajectory and at such velocity that they would be injured to a degree making them unmarketable if brought abruptly to rest. However, through the cooperative action of the cushion pads 518 (FIGS. 9 and 10), the freely suspended cushioning curtain 520, and the labyrinth 68 of flexible, draped decelerating members 522 within each receptor, the flight of each lemon within the receptor is gradually terminated. Moreover, tendency for the lemons to be injured by their colliding within a receptor 62 is minimized by the cushioned deflector plate 512 on which each lemon is bounced as it enters the receptor. Since the lemons are otherwise than spherical, they bounce off the plate 512 in divergent directions and thus are caused to follow different paths as they approach and pass through the associated labyrinth 68 of decelerating members 522.

Thus the lemons received by each receptor 62 are gradually decelerated and permitted to fall gently onto the belt 536 of the conveyor 70 (FIGS. 9, 10, 12, and 13) below the open bottom of the receptor. The conveyor 70 advances the lemons to and drops them onto the deflecting plate 584 (FIGS. 10 and 12–15) of the associated box filling station S (FIGS. 1 and 12). The plate 584 guides the lemons into a box initially supported in an upper position as illustrated in FIG. 20, so as to minimize the distance through which the lemons drop into the box when the box is empty or nearly so. As the lemons accumulate in the box, the increasing weight of the box and its contents operates the associated scales 816. Through the hereinabove described cooperative action of the contacts 1059–a, Sw7–a, Sw8–a, Sw9–a, and Sw10–a, or 1054–b, Sw7–b, Sw8–b, Sw9–b, and Sw10–b, as the case might be, the scales 816 actuates the associated elevator 80–a or 80–b to lower the box in a succession of small steps, as illustrated in FIGS. 21, 22, and 23, keeping the level of the accumulated lemons within the box at approximately the same distance below the deflector plate 584 to protect the lemons from being bruised by falling too far and yet to clear the lower end of the hopper 646–a or 646–b (FIGS. 13 and 20–22), through which the lemons drop into the box. When the box is filled to the desired capacity (FIG. 23), the deflector plate 584 is turned to its alternative position, thus causing lemons dropping from the associated conveyor belt 536 to be deflected into another box, which, through the action of its associated scales 816 and elevator mechanism 80–a or 80–b is similarly lowered proportionally with the accumulation of lemons therein.

When a deflector plate 584 is shifted to start feeding lemons into an empty box, the elevator 80–a or 80–b supporting the filled box that was responsible for shifting the plate 584, is permitted to drop to its lowest position, as hereinabove explained. Thus, the elevator lowers its platform 814 below the level of the associated filler conveyor 76–a or 76–b (FIGS. 12, 13, and 19–23) and thereby deposits the filled box on the conveyor. Since this conveyor is in constant operation, it immediately moves the filled box away from the elevator and onto the associated discharge conveyor 782 (FIG. 1) which carries the filled box to a suitable point of discharge.

As a filled box leaves the elevator 80–a or 80–b that supported it while being filled, the filler conveyor 76–a or 76–b that removed the filled box immediately replaces it with an empty box, as is best understood by reference to FIG. 23. As the empty box arrives in position over the recently vacated elevator 80–a or 80–b, it engages the associated rollers 1024 (FIGS. 12, 13, and 16–20) and thereby closes the associated switch Sw1–a or Sw1–b (FIGS. 12, 18–23, and 26), and thereby actuates the elevator mechanism to raise the empty box into upper filling position. Thus the box is placed in readiness to receive lemons, so that when filling of the box on the companion elevator is completed the deflector plate 584 can be promptly returned to the position wherein it guides lemons into the said replacement box. When this occurs and filling of the replacement box commences, the box that has just been filled is discharged and replaced by another empty box.

Thus it may be seen that when one box is filled to the desired capacity in any of the filling stations S, the deflector plate 584 of that station S is shifted to direct the lemons received by the associated receptor 62 into another box in the same station S, and that the filled box is removed from the machine 50 and replaced by an empty box while filling of the said other box is in progress. This operation is performed so rapidly that there is always at least one box in each station S in readiness to receive the lemons received by the associated receptor, regardless of how fast they arrive.

It should be observed that when a box in any of the filling stations S is filled to capacity and as a consequence thereof reaches the lowered position from which it is about to be deposited onto the associated filler conveyor 76–a or 76–b, the circuit containing the associated box stop switch Sw11 (FIGS. 12, 16, 17, and 26) is prepared for completion when the switch Sw11 is closed by the next box on the distributing conveyor 74 to reach the associated trip lever 1058. Therefore, when the said next box on the distributing conveyor 74 engages the trip lever 1058, the box that engaged the trip lever 1058 is stopped in alignment with the associated intercepting conveyor 690 and is conveyed thereby into alignment with, and is advanced onto, the filler conveyor 76–a or 76–b that was below the filled box responsible for such capture of an empty box from the distributing conveyor 74. As this occurs, the filled box is deposited onto the related filler conveyor and is started toward the discharge conveyor as hereinabove explained, and is replaced by the empty box that was being held in readiness on the associated filler conveyor to replace the said filled box. Thus, the space that the replacement box occupied on the filler conveyor is vacated in time for the said intercepted box to take its place, where it remains in readiness to replace the box that preceded it when the said preceding box is filled and discharged from the machine.

Thus it may be seen that the sorting machine 50 of the invention is adapted to sort lemons according to a plurality of color classification efficiently and at a high rate of speed in a continuous operation, and to fill the sorted lemons of each of the several types in boxes so that each box contains lemons of only one color type. The machine operates at such a high rate of speed that it can continuously sort lemons at a rate of the order of many field boxes full per minute. Moreover, each part of the machine handling the lemons after they have been sorted, and consequently concerned with only a part of the machine's output under normal operating conditions, has a capacity at least as great as the entire output of the machine. Thus, even if a run of lemons all of which fall within the same color classification, are fed into the machine, with the result that all lemons are discharged into a single receptor 62, the capacity of the receptor will not be exceeded, and even though boxes are filled rapidly by receiving the machine's entire output, they will be removed from the machine and replaced by empty boxes in sufficiently rapid succession to accommodate this extreme operating condition.

Whereas the machine of the present invention has been described as being adapted to sort lemons for color, it is to be understood that it can be employed to perform other sorting operations. For instance, by replacing the inspecting device with one adapted to detect size variations, the machine may be used for grading citrus or other types of fruit according to size.

While we have shown and described a preferred method and a preferred apparatus for carrying out our invention, it will be understood that both are capable of modification and variation while still employing the principles of the invention. It is to be understood, therefore, that the scope of the invention should be limited only by the scope and proper interpretation of the claims appended hereto.

Having thus described our invention, what we claim and desire to protect by Letters Patent is:

1. The method of sorting fruit which comprises centrifuging a supply of the fruit to disperse the same and to accelerate the individual pieces of the fruit to a predetermined velocity, controlling the rate of acceleration of the pieces during centrifuging thereof to protect the same from injury, guiding the dispersing pieces into a single file procession, inspecting the pieces in said procession to detect distinguishing characteristics of the individual pieces, distributing the pieces among a plurality of stations in accordance with the distinguishing characteristics detected during inspection thereof, and gradually decelerating the pieces at each of said stations.

2. The method of sorting fruit which comprises positively accelerating individual pieces of fruit to a predetermined velocity in a succession of graduated steps to protect the pieces from injury, aligning the accelerated pieces into a single file procession, inspecting the pieces in said procession to detect a distinguishing characteristic of each piece of fruit, distributing the pieces among a plurality of distribution stations in accordance with their said distinguishing characteristics detected by inspection thereof, and gradually decelerating the pieces at each of said stations.

3. Apparatus for sorting articles comprising inspecting means sensitive to and actuated differently by different characteristics of individual articles, means for receiving bulk quantities of articles to be sorted and for accelerating the individual articles to a predetermined velocity, means mounted in cooperative association with said accelerating means for movement with the same in position to receive the individual articles from the accelerating means for arranging the articles in single file procession and for advancing the same at said velocity through the zone of sensitivity of said inspecting means, a plurality of receptors mounted in position to receive articles from said advancing means, and individually operable means associated with each of said receptors for effecting discharge of articles from said advancing means into the respective receptor, each of said discharge effecting means being connected to the inspecting means to be actuated thereby in response to operation of the inspecting means by an article having a characteristic appropriate to the respective receptor.

4. Apparatus for sorting articles in a continuous operation, comprising means for supplying articles to be sorted, means mounted in position to receive the articles from said supplying means and operable to disperse the articles and accelerate the same to a predetermined velocity, conveyor means at least partially encircling said dispersing and accelerating means for guiding the articles while the articles are being dispersed by said dispersing means into a single file procession and for advancing the articles in the procession at substantially said predetermined velocity along a predetermined path, inspecting means mounted adjacent said path in position to inspect individually the articles in said procession, said inspecting means being differently operated by different characteristics of the individual articles, a plurality of receptors mounted adjacent said predetermined path at spaced intervals along the same, there being one such receptor for each of the types of articles into which the articles are to be segregated, selectively operable means associated with each of said receptors for effecting discharge of individual articles from said conveyor means into the respective receptor, each of said discharge effecting means being connected to said inspecting means to be actuated in response to operation of the inspecting means by an article of the type appropriate to the respective receptor, and means for decelerating the articles subsequently to their discharge from the conveyor means.

5. The method of disposing articles into single file which comprises introducing a plurality of the articles into a generally horizontally disposed receptacle, rotating the receptacle about its central vertical axis to effect movement of the articles toward the periphery of the receptacle by centrifugal force, restricting movement of the articles toward the periphery of the receptacle to predetermined paths extending radially of the receptacle, restricting the rate of movement of the articles along their respective radially extending paths, and feeding one article at a time from each of said radial paths into a single file extending circumferentially of the receptacle.

6. The method of arranging articles into single file which comprises dispersing a plurality of the articles by centrifugal force, guiding the articles into single file arrangement as they move in response to centrifugal force, and temporarily interrupting movement of the articles in response to centrifugal force to control their rate of movement in said single file arrangement.

7. The method of arranging articles into single file which comprises dispersing a plurality of the articles by centrifugal force, restricting the dispersing articles to a plurality of single file processions, restricting the rate of movement of the articles in said single file processions, and centrifuging articles singly from each single file procession into a single path intersecting all of said single file processions.

8. The method of disposing articles into single file which comprises dispersing a plurality of the articles by centrifugal force, guiding the dispersing articles into single file arrangement, and repeatedly interrupting dispersion of the articles while in said single file arrangement.

9. The method of arranging a plurality of articles into a single file procession which comprises dispersing the articles by centrifugal force, guiding the dispersing articles into a plurality of predetermined dispersion paths, restricting movement of the dispersing articles along said paths, and centrifuging the articles singly from each of said dispersion paths into a single path intersecting all of said dispersion paths.

10. The method of disposing articles into single file which comprises introducing a plurality of the articles into a generally horizontal receiver, centrifuging the articles toward the periphery of the receiver by rotating the receiver, restricting movement of said articles toward the periphery of the receiver to predetermined channels extending radially of the receiver, and discharging a predetermined number of the articles from each channel into receptacles moving with the receiver in radial alignment with the channels.

11. The method of inspecting articles which comprises centrifuging a plurality of the articles to effect dispersion of the articles by centrifugal force, guiding the articles moving under the influence of centrifugal force along a plurality of predetermined dispersion paths spiraling outward from said center, releasing the articles singly from each of said dispersion paths, centrifuging the discharged articles into a single file procession, advancing the procession in an arcuate path, and inspecting the articles during advancement thereof along said arcuate path.

12. The method of inspecting articles which comprises centrifuging a plurality of the articles to effect dispersion thereof, guiding the dispersing articles along a plurality of predetermined paths, releasing the articles singly from said paths for movement by centrifugal force into a single file procession, advancing the procession in a predetermined path, and inspecting the articles during advancement thereof in said procession.

13. The method of inspecting articles which comprises placing the articles into a receptacle, centrifuging the articles toward the periphery of the receptacle, restricting the rate of movement of the articles toward the periphery of the receptacle, confining movement of the articles within the receptacle to predetermined paths and discharging the articles one at a time from each of said paths by centrifugal force, aligning and advancing the articles discharged from said paths within an arcuate path adjacent the periphery of the receptacle, and inspecting the articles as they advance in said arcuate path.

14. The method of inspecting articles which comprises centrifuging a plurality of the articles to effect dispersion thereof, maintaining constant angular velocity of the articles as they disperse to accelerate them to increased linear velocity, aligning the linearly accelerating articles into a single file procession while substantially maintaining the increased linear velocity thereof attained by centrifugation, and inspecting the articles during progression thereof in said single file procession.

15. The method of gradually accelerating an article to predetermined linear velocity which comprises centrifuging the article to induce both rotary and radial movement thereof, and periodically interrupting radial movement of the article while maintaining constant angular velocity thereof to attain increased linear velocity of the article in a series of graduated steps.

16. The method of gradually accelerating an article which comprises revolving the article about an axis outside the article at a constant angular velocity and periodically effecting movement of the article to successively greater distances from said axis to increase the linear velocity of the article in a series of graduated steps.

17. The method of gradually accelerating an article which comprises revolving the article at constant angular velocity about a predetermined axis to effect movement of the article away from said axis, and controlling acceleration of the article by interrupting movement thereof at successively greater radial distances from the axis.

18. Apparatus for disposing a plurality of articles into single file arrangement, comprising a rotatably mounted upwardly concave receptacle adapted to receive the articles, means for rotating the receptacle to effect movement of the articles therein toward the periphery of the receptacle under the influence of centrifugal force, and means for guiding the articles into a single file arrangement extending radially of the receptacle as they are moved by centrifugal force.

19. Apparatus for arranging articles into single file, comprising means for revolving a plurality of the articles about a common center to disperse the articles by centrifugal force, means carried by said article revolving means for restricting the dispersing articles to paths extending radially of the revolving means, and means mounted in cooperative relation with said article revolving means for regulating the average rate of movement of the articles in response to centrifugal force.

20. Apparatus for aligning articles, comprising a rotatably mounted receptacle adapted to receive articles to be aligned, means for rotating the receptacle to centrifuge articles within the receptacle, a series of aligned receivers mounted adjacent the perimeter of the receptacle for movement therewith, means defining channels for the articles leading radially of the receptacle toward said receivers, and means associated with each of said channels for periodically interrupting movement of an article therein.

21. Apparatus for aligning articles, comprising a rotatably mounted receptacle adapted to receive articles to be aligned, means for rotating the receptacle to centrifuge articles within the receptacle, a series of aligned receivers mounted adjacent the perimeter of the receptacle for movement therewith, said receptacle including means for guiding the articles radially of the receptacle toward said receivers for guiding the articles as the articles move under the influence of centrifugal force and for regulating radial movement of articles within the receptacle.

22. Apparatus for aligning articles, comprising a rotatably mounted receptacle adapted to receive articles to be aligned, means for rotating the receptacle to centrifuge articles within the receptacle, a plurality of receivers mounted adjacent the perimeter of the receptacle for movement therewith, said receptacle including means defining a channel leading radially of the receptacle toward each of said receivers for guiding the articles as the articles move under the influence of centrifugal force and for controlling movement of articles along the same.

23. Apparatus for aligning articles, comprising a rotatably mounted receptacle adapted to receive articles to be aligned, means for rotating the receptacle to centrifuge articles within the receptacle, said receptacle including an upstanding rim forming the perimeter of the receptacle adapted to obstruct movement of the articles caused by the centirfugal force imparted by the rotation of the receptacle, means carried by the receptacle for elevating one of the articles high enough to pass over the rim in response to centrifugal force, and a receiver mounted adjacent the perimeter of the receptacle in position to receive an article caused by said elevating means to pass over the rim.

24. Apparatus for aligning articles, comprising a rotatably mounted receptacle adapted to receive articles to be aligned, means for rotating the receptacle to centrifuge articles within the receptacle to effect movement of the articles radially outward of the receptacle, said receptacle including an upstanding rim adapted to obstruct radial movement of the articles caused by the centrifuging, means defining a series of receivers adjacent and movable with the rim of the receptacle, and means carried by the receptacle in cooperative association with each of said receivers for raising one of the articles high enough to clear said rim at a point in radial alignment with the respective receiver to cause the article to resume movement in response to centrifugal force.

25. Apparatus for aligning articles, comprising a rotatably mounted receptacle adapted to receive articles to be aligned, means for rotating the receptacle to centrifuge articles within the receptacle, and a series of receivers mounted adjacent the perimeter of the receptacle for movement therewith and in aligned relation with each other, said receptacle including means associated with each receiver defining a channel leading radially of the receptacle toward the receiver, abutment means associated with each of said channels for obstructing passage of articles along the same, and means cooperatively associated with said receptacle operable to lift one article at a time over each of said abutment means to permit resumption of centrifuging of the single article toward the associated receiver.

26. Apparatus for accelerating an article to a predetermined linear velocity comprising a receptacle mounted for rotation about a central axis and adapted to receive an article to be accelerated, means for rotating the receptacle to urge the article away from said axis by centrifugal force, means carried by the receptacle for positively revolving the article about said axis at the same angular velocity as that of the receptacle, and means carried by the receptacle for periodically interrupting movement of the article at progressively greater radial distances from said axis to attain movement of the article to a position at a predetermined distance from the axis in a sequence of graduated steps.

27. Apparatus for accelerating an article to a predetermined linear velocity comprising a receptacle mounted for rotation about a central axis and adapted to receive an article to be accelerated, means for rotating the receptacle to urge the article away from said axis by centrifugal force, guide means on said receptacle engageable with the article and restricting movement of the article in response to said centrifugal force to movement radially thereof to positively revolve the article at the same angular velocity as the receptacle while the linear velocity of the article increases proportionally with increase in the distance of the article from said axis, and means for periodically interrupting movement of the article away from the axis at progressively greater radial distances therefrom to attain acceleration of the article to a predetermined linear velocity in a succession of graduated steps.

28. Article feeding apparatus comprising a rotatably mounted receptacle adapted to receive a plurality of articles, means for rotating the receptacle to urge articles within the receptacle toward and to the perimeter of the receptacle by centrifugal force, said receptacle including an upstanding rim adapted to interrupt movement of the articles outwardly of the receptacle by the action of the stated centrifugal force, means for raising a predetermined number of the articles to the upper edge of the rim to effect resumption of outward motion of the raised articles under the influence of centrifugal force, and means for periodically operating said article raising means.

29. Article feeding apparatus comprising a rotatably mounted receptacle adapted to receive a plurality of articles, means for rotating the receptacle to urge articles within the receptacle toward the perimeter of the receptacle by centrifugal force, said receptacle including a plurality of upstanding rims of progressively greater diameters adapted to interrupt movement of the articles outwardly of the receptacle caused by the stated centrifugal force, means carried by the receptacle in association with each rim for raising one of the articles to a position wherein the article is moved over the respective rim by centrifugal force, and means for periodically operating said article raising means.

30. A machine for feeding fruit comprising a receptacle mounted for rotation about a central axis and adapted to receive a supply of fruit, means for rotating the receptacle to yieldably urge the fruit radially outward of the receptacle, a plurality of receivers arranged about the periphery of the receptacle, said receptacle including means associated with each receiver for guiding pieces of fruit singly into the respective receiver, means carried by the receptacle and associated with each guiding means for temporarily blocking movement of fruit toward the associated receiver, and means operable periodically for effecting release of fruit from said blocking means.

31. A machine for feeding fruit comprising a receptacle mounted for rotation about a central axis and adapted to receive a supply of fruit, means for rotating the receptacle to centrifuge the fruit radially outward of the receptacle, a plurality of receivers mounted in cooperative association with the receptacle and arranged about the periphery of the same, said receptacle including means associated with each receiver for guiding pieces of centrifuged fruit singly into the respective receiver, means associated with each guiding means for blocking movement of centrifuged fruit toward the associated receiver, means operable periodically for releasing centrifuged fruit from said blocking means, and means operable between successive operations of said releasing means for effecting release of fruit from the associated receiver.

32. Apparatus for decelerating rapidly moving fruit, comprising a labyrinth of movable members, means mounting said members in positions to be successively engaged and moved by a moving fruit to gradually absorb the kinetic energy of the moving fruit, each of said movable members including a flexible core and a plurality of spools of resilient material rotatable on the core.

33. Apparatus for decelerating rapidly moving fruit, comprising a labyrinth of movable members, means mounting said members in positions for at least some of the members to be successively engaged and moved by a moving fruit to gradually absorb the kinetic energy of the moving fruit, each of said movable members including a flexible core and a plurality of spools of resilient material rotatable on the core, each of said spools having a plurality of projecting resilient fins yieldable under the impact of a fruit thereagainst.

34. Apparatus for decelerating rapidly moving fruit, comprising a labyrinth of intercepting members and means mounting the intercepting member in positions extending across the path of the moving fruit, each of said intercepting member including a flexible core loosely suspended between horizontally spaced parts of the mounting means to describe the catenary curve, and a plurality spools rotatable on the core and having resiliently yieldable projecting fins.

35. Apparatus for decelerating rapidly moving fruit, comprising a labyrinth of intercepting members and means mounting the intercepting members in the path of the fruit, each of said intercepting members including a core and a plurality of spools rotatable on the core, each of said spools having projecting fins of resilient material.

36. Apparatus for decelerating rapidly moving fruit, comprising a labyrinth of intercepting members, each of said intercepting members including a core and a plurality of spools rotatable on the core, each of said spools having projecting fins of resilient material, and means mounting said intercepting members in positions extending transversely of the path of the moving fruit and spaced apart a distance less than the diameter of a piece of the fruit of average size to insure impingement of all fruit passing between two intercepting members against at least one of the members.

37. Apparatus for decelerating rapidly moving fruit, comprising a labyrinth of intercepting members and means mounting said members in the path of the moving fruit in positions spaced apart a distance less than the diameter of a piece of the fruit of average size to insure impingement of all fruit passing between two intercepting members against at least one of the members, each of said intercepting members including a core and a plurality of spools rotatable on the core, each of said spools having a plurality of projecting fins of resilient material, said cores being laterally flexible and yieldable under impact of a fruit against the spools to facilitate passage of a fruit between adjacent intercepting members.

38. In fruit handling apparatus, a member for decelerating moving fruit comprising a flexible core and a spool of resilient material rotatable on said core, and means mounting said decelerating member in position to be engaged by the moving fruit.

39. In fruit handling apparatus, a member for decelerating moving fruit comprising a flexible core and a spool of resilient material rotatable on said core, said spool having projecting fins of resilient material, and means mounting said decelerating members in position to be engaged by the moving fruit.

40. In fruit handling apparatus, a member for decelerating moving fruit comprising a flexible core and a plurality of spools of resilient material rotatable on said core, and means mounting said decelerating member in position to be engaged by the moving fruit.

41. In fruit handling apparatus, a member for decelerating moving fruit comprising a flexible core and a plurality of spools of resilient material rotatable on said core, said spools having projecting fins of resilient material, and means mounting said decelerating members in position to be engaged by the moving fruit.

References Cited in the file of this patent

UNITED STATES PATENTS

| | | |
|---|---|---|
| 1,090,817 | Knoerzer | Mar. 17, 1914 |
| 1,119,662 | Sutton | Dec. 1, 1914 |
| 1,133,436 | Gramling | Mar. 30, 1915 |
| 1,920,701 | Jenkins | Aug. 1, 1933 |
| 1,970,107 | Stebler | Aug. 14, 1934 |
| 1,987,916 | Thompson | Jan. 15, 1935 |
| 2,068,101 | Freund | Jan. 19, 1937 |
| 2,138,475 | Hilton | Nov. 29, 1938 |
| 2,158,023 | Smith | May 9, 1939 |
| 2,318,856 | Hoffman | May 11, 1943 |
| 2,325,665 | Cox | Aug. 3, 1943 |
| 2,463,578 | Tyler | Mar. 8, 1949 |
| 2,536,516 | Peterson | Jan. 2, 1951 |
| 2,552,620 | Christian | May 15, 1951 |
| 2,580,275 | Bickley | Dec. 25, 1951 |
| 2,582,007 | Christiansen | Jan. 8, 1952 |
| 2,629,480 | Williams | Feb. 24, 1953 |
| 2,647,670 | Cox | Aug. 4, 1953 |
| 2,656,923 | Cox | Oct. 27, 1953 |
| 2,675,917 | Powers | Apr. 20, 1954 |
| 2,679,317 | Roop | May 25, 1954 |
| 2,684,155 | Hartrampf | July 20, 1954 |
| 2,696,297 | Matthews | Dec. 7, 1954 |
| 2,825,456 | Cox | Mar. 4, 1958 |
| 2,833,937 | Cox | May 6, 1958 |
| 2,895,274 | Mumma | July 21, 1959 |

FOREIGN PATENTS

| | | |
|---|---|---|
| 419,375 | Great Britain | Nov. 12, 1934 |